US 8,342,281 B2

(12) United States Patent
Rooney, III et al.

(10) Patent No.: US 8,342,281 B2
(45) Date of Patent: Jan. 1, 2013

(54) HULL ROBOT STEERING SYSTEM

(75) Inventors: James H. Rooney, III, Harvard, MA (US); Jonathan T. Longley, Andover, MA (US); Scott Allen, Jamaica Plain, MA (US)

(73) Assignee: Raytheon Company, Waltham, MA (US)

( * ) Notice: Subject to any disclaimer, the term of this patent is extended or adjusted under 35 U.S.C. 154(b) by 146 days.

(21) Appl. No.: 12/800,174

(22) Filed: May 10, 2010

(65) Prior Publication Data

US 2010/0219003 A1    Sep. 2, 2010

Related U.S. Application Data

(63) Continuation-in-part of application No. 12/313,643, filed on Nov. 21, 2008.

(51) Int. Cl.
*B60B 39/00* (2006.01)
(52) U.S. Cl. ........................................ 180/164
(58) Field of Classification Search .................. 180/164, 180/235, 7.1, 9, 9.1, 116, 117; 901/1; 114/222
See application file for complete search history.

(56) References Cited

U.S. PATENT DOCUMENTS

| | | | |
|---|---|---|---|
| 2,104,062 A | 1/1938 | Temple | |
| 2,132,661 A | 11/1938 | Temple | |
| 2,386,650 A | 10/1945 | Bell | |
| 3,088,429 A | 5/1963 | Johannessen | |
| 3,285,676 A | 11/1966 | Hetteen | |
| 3,439,937 A * | 4/1969 | Dixon | 280/426 |
| 3,554,300 A | 1/1971 | Rosenberg | |
| 3,638,600 A | 2/1972 | Modrey | |
| 3,777,834 A | 12/1973 | Hiraoka et al. | |
| 3,922,991 A | 12/1975 | Woods | |
| 3,934,664 A | 1/1976 | Pohjola | |
| 3,946,692 A | 3/1976 | Sierra et al. | |
| 3,960,229 A | 6/1976 | Shio | |
| 3,984,944 A | 10/1976 | Maasberg et al. | |
| 4,046,429 A | 9/1977 | Pohjola | |
| 4,079,694 A | 3/1978 | Galinou | |
| 4,119,356 A | 10/1978 | Pohjola | |
| 4,135,592 A | 1/1979 | Vincent | |

(Continued)

FOREIGN PATENT DOCUMENTS

DE        3611750        10/1987

(Continued)

OTHER PUBLICATIONS

Written Opinion of the International Searching Authority, International Application No. PCT/US2011/000787, Jul. 20, 2011, 7 pgs. (unnumbered).

(Continued)

*Primary Examiner* — Tony Winner
(74) *Attorney, Agent, or Firm* — Thorpe North & Western LLP

(57) ABSTRACT

A robot drive system preferably used for a vessel hull cleaning and/or inspection robot includes a first frame portion rotatably supporting a first axle with a first wheel thereon, and a second frame portion rotatably supporting a second axle with a second wheel thereon. A joint connects the first frame portion to the second frame portion and defines an expendable and contractible portion between the first frame portion and second frame portion. An actuator subsystem is configured expand and contract the expandable and contractible portion to move the first frame portion relative to the second frame portion at the joint to angle the first axle relative to the second axle to steer the robot.

43 Claims, 22 Drawing Sheets

U.S. PATENT DOCUMENTS

| | | | |
|---|---|---|---|
| 4,202,453 A * | 5/1980 | Wilkes et al. | 212/290 |
| 4,251,791 A | 2/1981 | Yanagisawa et al. | |
| 4,401,048 A | 8/1983 | Rogers | |
| 4,574,722 A | 3/1986 | Orita et al. | |
| 4,674,949 A | 6/1987 | Kroczynski | |
| 4,690,092 A | 9/1987 | Rabuse | |
| 4,697,536 A | 10/1987 | Hirata | |
| 4,734,954 A | 4/1988 | Greskovics et al. | |
| 4,736,826 A | 4/1988 | White et al. | |
| 4,789,037 A | 12/1988 | Kneebone | |
| 4,809,383 A | 3/1989 | Urakami | |
| 4,841,894 A | 6/1989 | Nellessen, Jr. | |
| 4,890,567 A | 1/1990 | Caduff | |
| 4,926,775 A | 5/1990 | Andorsen | |
| 5,048,445 A | 9/1991 | Lever et al. | |
| 5,174,222 A | 12/1992 | Rogers | |
| 5,203,646 A | 4/1993 | Landsberger et al. | |
| 5,249,631 A | 10/1993 | Ferren | |
| 5,253,605 A | 10/1993 | Collins | |
| 5,253,724 A * | 10/1993 | Prior | 180/6.5 |
| 5,285,601 A | 2/1994 | Watkin et al. | |
| 5,366,038 A * | 11/1994 | Hidetsugu et al. | 180/164 |
| 5,435,405 A | 7/1995 | Schempf et al. | |
| 5,569,371 A | 10/1996 | Perling | |
| 5,628,271 A | 5/1997 | McGuire | |
| 5,849,099 A | 12/1998 | McGuire | |
| 5,852,984 A | 12/1998 | Matsuyama et al. | |
| 5,894,901 A | 4/1999 | Awamura et al. | |
| 5,947,051 A | 9/1999 | Geiger | |
| 6,000,484 A | 12/1999 | Zoretich et al. | |
| 6,053,267 A | 4/2000 | Fisher | |
| 6,064,708 A | 5/2000 | Sakamaki | |
| 6,102,145 A | 8/2000 | Fisher | |
| 6,125,955 A | 10/2000 | Zoretich et al. | |
| 6,276,478 B1 | 8/2001 | Hopkins et al. | |
| 6,317,387 B1 | 11/2001 | D'Amaddio et al. | |
| 6,564,815 B2 | 5/2003 | McGuire | |
| 6,595,152 B2 | 7/2003 | McGuire | |
| 6,698,376 B2 | 3/2004 | Delahousse et al. | |
| 6,792,335 B2 | 9/2004 | Ross et al. | |
| 6,886,486 B2 | 5/2005 | Van Rompay | |
| 6,886,651 B1 | 5/2005 | Slocum et al. | |
| 7,296,530 B1 | 11/2007 | Bernstein et al. | |
| 7,390,560 B2 | 6/2008 | Wallach | |
| 7,520,356 B2 * | 4/2009 | Sadegh et al. | 180/164 |
| 7,866,421 B2 * | 1/2011 | Moore et al. | 180/9.21 |
| 7,934,575 B2 | 5/2011 | Waibel et al. | |
| 2003/0000445 A1 | 1/2003 | McGuire | |
| 2004/0089216 A1 | 5/2004 | Van Rompay | |
| 2004/0133999 A1 | 7/2004 | Walton | |
| 2005/0027412 A1 | 2/2005 | Hobson et al. | |
| 2005/0156562 A1 | 7/2005 | Cohen et al. | |
| 2005/0216125 A1 | 9/2005 | Huston et al. | |
| 2006/0175439 A1 | 8/2006 | Steur et al. | |
| 2006/0191457 A1 | 8/2006 | Murphy | |
| 2006/0249622 A1 | 11/2006 | Steele | |
| 2006/0261772 A1 | 11/2006 | Kim | |
| 2007/0089916 A1 | 4/2007 | Lundstrom | |
| 2007/0276552 A1 | 11/2007 | Rodocker et al. | |
| 2007/0284940 A1 | 12/2007 | Koolhiran | |
| 2008/0202405 A1 | 8/2008 | Kern | |
| 2008/0276407 A1 * | 11/2008 | Schnittman et al. | 15/319 |
| 2008/0281470 A1 | 11/2008 | Gilbert, Jr. et al. | |
| 2009/0078484 A1 | 3/2009 | Kocijan | |
| 2009/0094765 A1 | 4/2009 | Osaka et al. | |
| 2009/0166102 A1 | 7/2009 | Waibel et al. | |
| 2009/0301203 A1 | 12/2009 | Brussieux | |
| 2010/0000723 A1 * | 1/2010 | Chambers | 165/163 |
| 2010/0126403 A1 | 5/2010 | Rooney, III et al. | |
| 2010/0131098 A1 | 5/2010 | Rooney, III et al. | |
| 2010/0217436 A1 * | 8/2010 | Jones et al. | 700/245 |
| 2010/0219003 A1 | 9/2010 | Rooney, III et al. | |

FOREIGN PATENT DOCUMENTS

| | | |
|---|---|---|
| GB | 2038721 A | 7/1980 |
| WO | WO 02/074611 A2 | 9/2002 |
| WO | WO 02/074611 A3 | 9/2002 |
| WO | WO 2005/014387 A1 | 2/2005 |

OTHER PUBLICATIONS

Written Opinion of the International Searching Authority, International Application No. PCT/US2011/000770, Aug. 9, 2011, 5 pgs. (unnumbered).

Written Opinion of the International Searching Authority, International Application No. PCT/US2010/002163, Oct. 13, 2010, 5 pgs. (unnumbered).

Written Opinion of the International Searching Authority, International Application No. PCT/US2010/002164, Oct. 8, 2010, 5 pgs. (unnumbered).

U.S. Appl. No. 12/586,248, filed Sep. 18, 2009, Rooney III et al.
U.S. Appl. No. 12/587,949, filed Oct. 14, 2009, Kornstein et al.
U.S. Appl. No. 12/800,486, filed May 17, 2010, Rooney, III.
Townsin, R.L., The Ship Hull Fouling Penalty, Biofouling, vol. 19, (supplement), Jan. 1, 2003, pp. 9-15.

Rosenhahn et al., Advanced Nanostructures for the Control of Biofouling: The FP 6 EU Integrated Project AMBIO, Biointerphases 3(1) Mar. 2008, published Feb. 21, 2008; pp. IR1-IR5.

Preiser et al., Energy (Fuel) Conservation Through Underwater Removal and Control of Fouling on Hulls of Navy Ships, Naval Research and Development Center, Materials Department, Annapolis, Research and Development Report, Dec. 1975, 52 pgs.

Man, B&W, Basic Principles of Ship Propulsion, Basics of Ship Propulsion, pp. 1-30, Apr. 2004.

A Copenhagen Climate Treaty, Version 1.0 Draft, A Proposal for a Copenhagen Agreement by Members of the NGO Community, published Jun. 2009, pp. 1-78 (80 pages total).

Yuan, et al., The Design of Underwater Hull-Cleaning Robot, Journal of Marine Science and Application, vol. 3, No. 1, Jun. 2004, pp. 41-45.

Tallett, et al., Potential Marine Fuels Regulations: Impacts on Global Refining, Costs & Emissions, Joint IFQC & IPIECA Roundtable: Impacts of CO2 Emissions from Refining & Shipping, London, England Oct. 1, 2007, 17 pgs.

RTI International, EnSys Energy & Systems, Inc., Navigistics Consulting; Global Trade and Fuels Assessment—Future Trends and Effects of Designating Requiring Clean Fuels in the Marine Sector: Task Order No. 1, Draft Report, RTI Project No. 0209701.001, Apr. 2006 (82 pages total).

Anti-Fouling Systems, Focus on IMO, International Maritime Organization, UK, 2002, pp. 1-31. http://www.uscg.mil/hq/cg5/cg522/cg5224/docs/FOULING2003.pdf.

Fernandez, Linda, NAFTA and Member Country Strategies for Maritime Trade and Marine Invasive Species, Journal of Environmental Management 89, 2008, pp. 308-321.

Munk, Torben, Fuel Conservation Through Managing Hull Resistance, Motorship Propulsion Conference, Copenhagen, Apr. 26, 2006 pp. 1-10.

Kohli, Nikita, Biofouling and Design of a Biomimetic Hull-Grooming Tool, Naval Surface Warfare Center Carderock Division, West Bethesda, MD, NSWCCD-CISD-2007/002, Ship Systems Integration & Design Department Technical Report, Sep. 2007, 38 pages total.

HISMAR *Hull Identification System for Maritime Autonomous Robots*, http://hismar.ncl.ac.uk/public_docs/HISMAR_Poster.pdf (1 page).

HISMAR *HISMAR News Report No. 2. 2008*, http://hismar.ncl.ac.uk/public_docs/News_Reports/News%20Report%20No2_UNEW.pdf (4 pages).

S. Reed, A. Cormack, K. Hamilton, I. Tena Ruiz, and D. Lane. "*Automatic Ship Hull Inspection using Unmanned Underwater Vehicles*," Proceedings from the 7$^{th}$ International Symposium on Technology and the Mine Problem. Monterey, USA. May, 2006 (10 pages).

Vaganay, J., Elkins, M., Espositio, D., Oapos, Halloran, W., Hover, F., Kokko, M. *Ship Hull Inspection with the HAUV: US Navy and NATO Demonstrations Results*, OCEANS 2006, Vol., Issue, Sep. 18-21, 2006, pp. 1-6.

Borchardt, John, Grooming the Fleet, Mechanical Engineering, vol. 132/No. 4 Apr. 2010, pp. 33-35.

Written Opinion of the International Searching Authority for PCT Application No. PCT/US2009/006122 mailed Feb. 3, 2010 (seven (7) pages).

Lee Min Wai Serene and Koh Cheok Wei, "Design of a Remotely Operated Vehicle (ROV) for Underwater Ship Hull Cleaning," National University of Singapore, 2003, pp. 1-6.

Fu-cai et al., "The Design of Underwater Hull-Cleaning Robot," *Journal of Marine Science and Application*, vol. 3, No. 1, Jun. 2004, pp. 41-45.

Written Opinion of the International Searching Authority, International Application No. PCT/US2010/002693, Dec. 9, 2010, 8 pgs. (unnumbered).

U.S. Appl. No. 12/313,643, filed Nov. 21, 2008; James H. Rooney III; office action issued Apr. 13, 2012.

U.S. Appl. No. 12/586,248, filed Sep. 18, 2009; James H. Rooney III; office action issued May 24, 2012.

U.S. Appl. No. 12/587,949, filed Oct. 14, 2009; Howard R. Kornstein; office action issued May 25, 2012.

U.S. Appl. No. 12/587,949, filed Oct. 14, 2009; Howard R. Kornstein; notice of allowance mailed Sep. 21, 2012.

U.S. Appl. No. 12/583,346, filed Aug. 19, 2009; James H. Rooney III; office action dated Sep. 25, 2012.

U.S. Appl. No. 12/313,643, filed Nov. 21, 2008; James H. Rooney III; office action dated Sep. 17, 2012.

\* cited by examiner

HULL ROBOT STEERING SYSTEM

RELATED APPLICATIONS

This application is a continuation-in-part application which claims the benefit of and priority to U.S. patent application Ser. No. 12/313,643, filed Nov. 21, 2008 under 35 U.S.C. §§119, 120, 363, 365, and 37 C.F.R. §1.55 and §1.78, incorporated herein by this reference. The subject application is related to U.S. patent application Ser. No. 12/583,346, filed Aug. 19, 2009 and U.S. patent application Ser. No. 12/587,949 filed Oct. 14, 2009.

FIELD OF THE INVENTION

The subject invention relates to a drive system, typically for a hull robot configured to clean and/or inspect the hull of a vessel.

BACKGROUND OF THE INVENTION

Co-pending U.S. patent application Ser. No. 12/313,643 filed Nov. 21, 2008 discloses a new autonomous hull robot including turbines driven by water flowing past the hull while the vessel is underway. The turbines operate (e.g., power) the cleaning and the drive subsystems of the robot.

Most prior hull cleaning robots suffer from several shortcomings. Typically, the robots are connected to a cable and powered and controlled by an on-board power supply and control subsystem and are able to operate only on a stationary vessel.

BRIEF SUMMARY OF THE INVENTION

It is desirable to be able to turn the robot as it traverses the hull of a vessel. Typically, the drive system for the robot includes one or more wheels, rollers, or magnetic tracks, e.g., structures which roll on the hull. Complex steering systems or steering systems with numerous moveable components are not desirable.

If the steering angle of the drive system is very small, the resulting turning radius may be fairly large, but, since the hull of a ship is very large in area compared to the size of the robot, a large turning radius may be satisfactory. That realization enables the innovation of a drive system which can include relatively few moving parts and which is robust and simple in design. Alignment and adjustment of various components may not be required.

This invention features, in one aspect, a robot drive system comprising a frame including a first frame portion rotatably supporting a first axle with a first wheel thereon. A second frame portion rotatably supports a second axle with a second wheel thereon. A joint connects the first frame portion to the second frame portion and defines an expendable and contractible portion between the first frame portion and second frame portion. An actuator subsystem is configured expand and contract the expandable and contractible portion to move the first frame portion relative to the second frame portion at the joint to angle the first axle relative to the second axle to steer the robot.

The first and second axles may each include a pair of magnetic wheels. The first and second wheels may be drum shaped and include alternating magnetic and ferromagnetic material. The second frame portion can include a module with spaced side walls for the second axle or it may house two axles of a magnetic track subsystem. The second frame portion may include a third wheel on a third axle spaced from the second axle and a magnetic track about the second and third wheels.

Typically at least one of the first and second frame portions includes a propulsion subsystem for driving the robot. One propulsion subsystem includes a motor with a drive shaft. There may be a drive train between the drive shaft and a wheel. For example, the drive train may include a first pulley coupled to the wheel, a second pulley coupled to the drive shaft, and a belt about the first and second pulleys.

In one embodiment the joint includes a flexible member between the first frame portion and the second frame portion. In other embodiments, the joint includes a hinged portion between the first frame portion and the second frame portion.

In one version, the actuator subsystem includes a shaft including threads in one direction on a first end and threads in an opposite direction on a second end. The first end of the shaft extends into a threaded orifice of the first frame portion and the second end extends into a threaded orifice of the second frame portion. The threaded orifices may include barrel nuts therein. One preferred actuator subsystem also includes means for rotating the shaft. In one design the means for rotating the shaft includes a piston coupled to the shaft and extending from a cylinder connected to the pivotable joint. The actuator subsystem may further include a coupling member between the piston and the shaft. In another design, the actuator subsystem includes a motor associated with the first frame portion driving a shaft threaded into the second frame portion.

In some embodiments, one of the first and second frame portions includes a second joint, a second expandable and contractible portion, and a second actuator subsystem configured to expand and contract the second expandable and contractible portion and angle the first axle relative to the second axle at the second joint. The joint can be located on one side of the frame or located interior to the frame defining first and second expandable and contractible portions. In this example, there is typically an actuator subsystem on each side of the joint configured to expand and contract the first and second expandable and contractible portions.

The invention also features a robot drive system comprising a frame including spaced side walls, a first axle rotatably disposed between the spaced side walls, a second axle, spaced from the first axle, and rotatably disposed between the spaced side walls. An expandable and contractible portion in the frame is located between the first and second axles. An actuator subsystem is configured to expand and contract the expandable and contractible portion to angle the first axle relative to the second axle to steer the robot. In one preferred design, the expandable portion includes a gap in the frame and a joint spanning the gap and the joint includes a flexible member spanning the gap.

An example of a robot drive in accordance with this invention features a first frame portion housing a first magnetic rolling means, a second frame portion housing a second magnetic rolling means, and at least one expandable and contractible portion defined by a joint between the first and second frame portions. An actuator subsystem is configured to expand and contract the expandable portion and flex the joint to angle the first magnetic roller means relative to the second magnetic roller means to steer the robot. A propulsion subsystem is included for at least one of the first and second magnetic roller means to drive the robot. In one example, the first and second magnetic rolling means each include one or more magnetic wheels, drums, and/or tracks.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
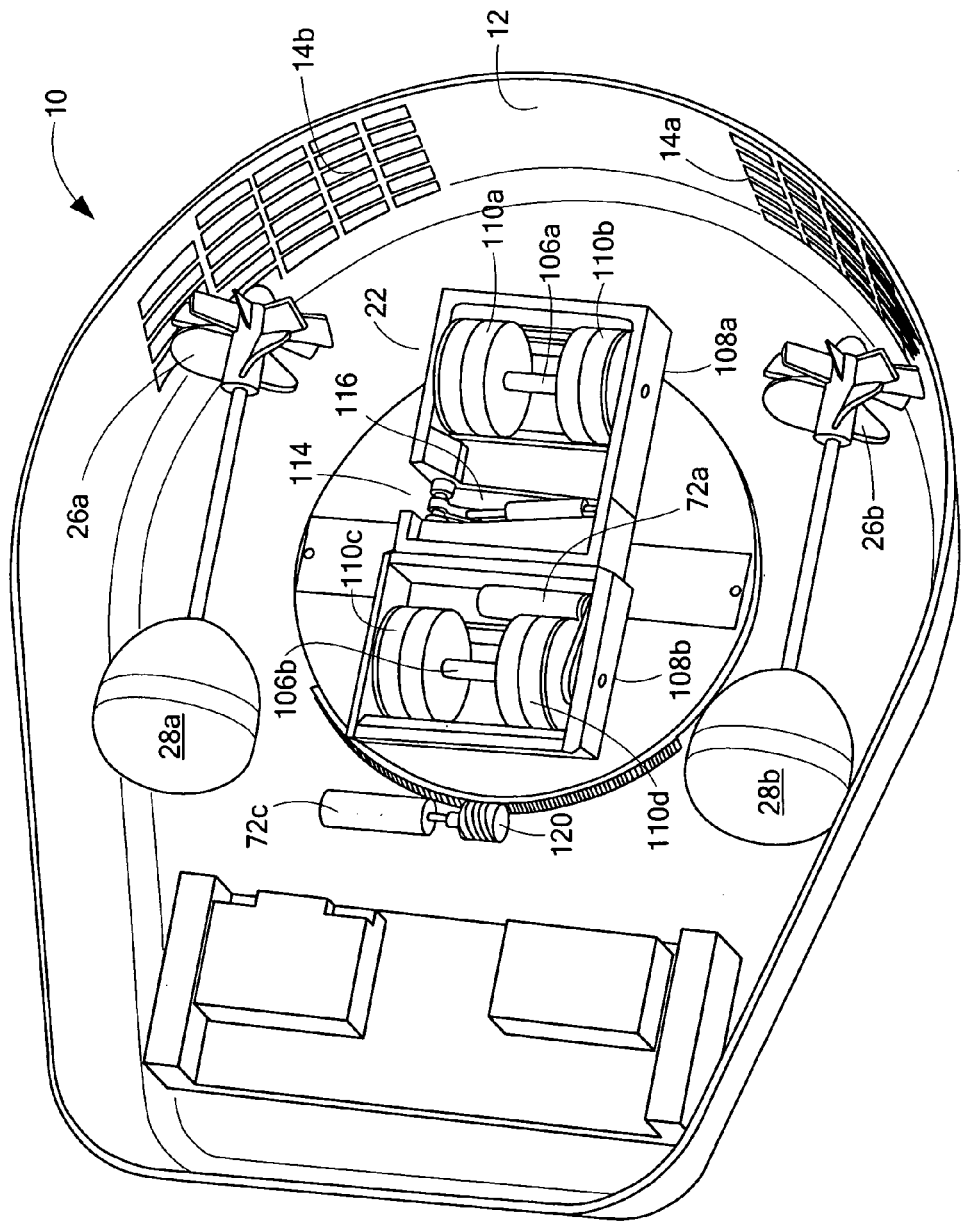
FIG. 1 is a schematic three-dimensional bottom view of a hull robot in accordance with the invention showing an example where a robot drive subsystem is mounted to a rotatable turret.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 2:
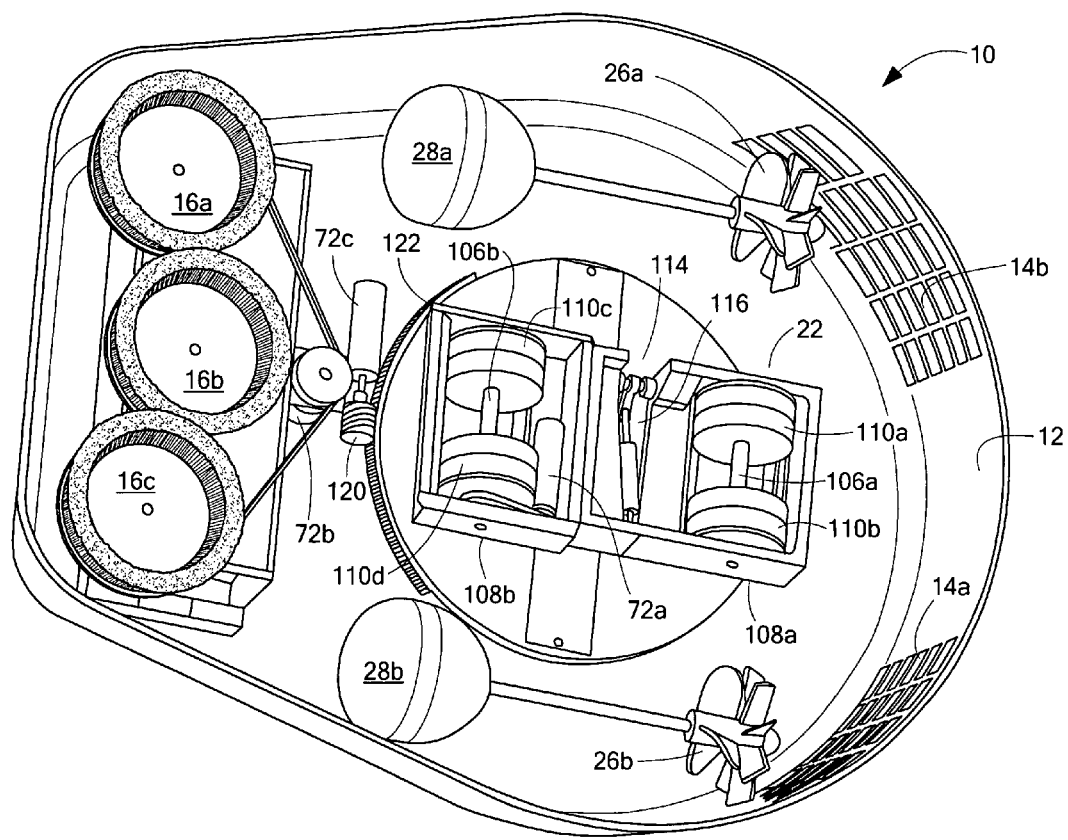
FIG. 2 is a schematic three-dimensional bottom view of an example of a hull robot including cleaning brushes.

FIGS. 1-2 show robot 10 including robot body 12 with turbine intake vents 14a and 14b. Cleaning brushes 16a, 16b, and 16c are shown in FIG. 2. A magnetic drive system 22 is typically used to adhere the robot to the hull and to maneuver the robot about the hull.

In the examples shown, turbines 26a and 26b drive generators 28a and 28b, respectively. Turbines 26a and 26b are driven by water flowing past the vessel hull when the vessel is underway. Generators 28a and 28b recharge a power source such as a battery. One or more motors are powered by the power source. An electronic controller is also powered by the power source.

For example, FIG. 1 shows motor 72c driving turret 24. Motor 72c is powered by the power source and is controlled by an electronic subsystem or controller. Motor 72c drives worm gear 120 engaged with peripheral gear 122 on turret 24. Turret 24 rotates with respect to the hull via a shaft or the like. Other actuator systems for adjusting the position of turret 24 are possible. In this way, as the robot turns via drive system 22, turbines 26a and 26b can be kept in alignment with the flow of water past the hull.

Typically, other subsystems are included as components of the robot, for example, a navigation subsystem, a communication subsystem, and the like. Preferably robot body 12 need not be tethered to any kind of an on-board power or control subsystem. The turbine subsystem can operate the drive subsystem (and, in one example, a cleaning subsystem) directly or via a generator charging a power subsystem (e.g., a battery pack) which supplies power to one or more motors driving the drive subsystem and/or the cleaning subsystem. The battery pack can also be used to energize the other electronic and/or electromechanical subsystems associated with the robot. It is also possible for a generator to drive one or more motors directly.

Figure 3:
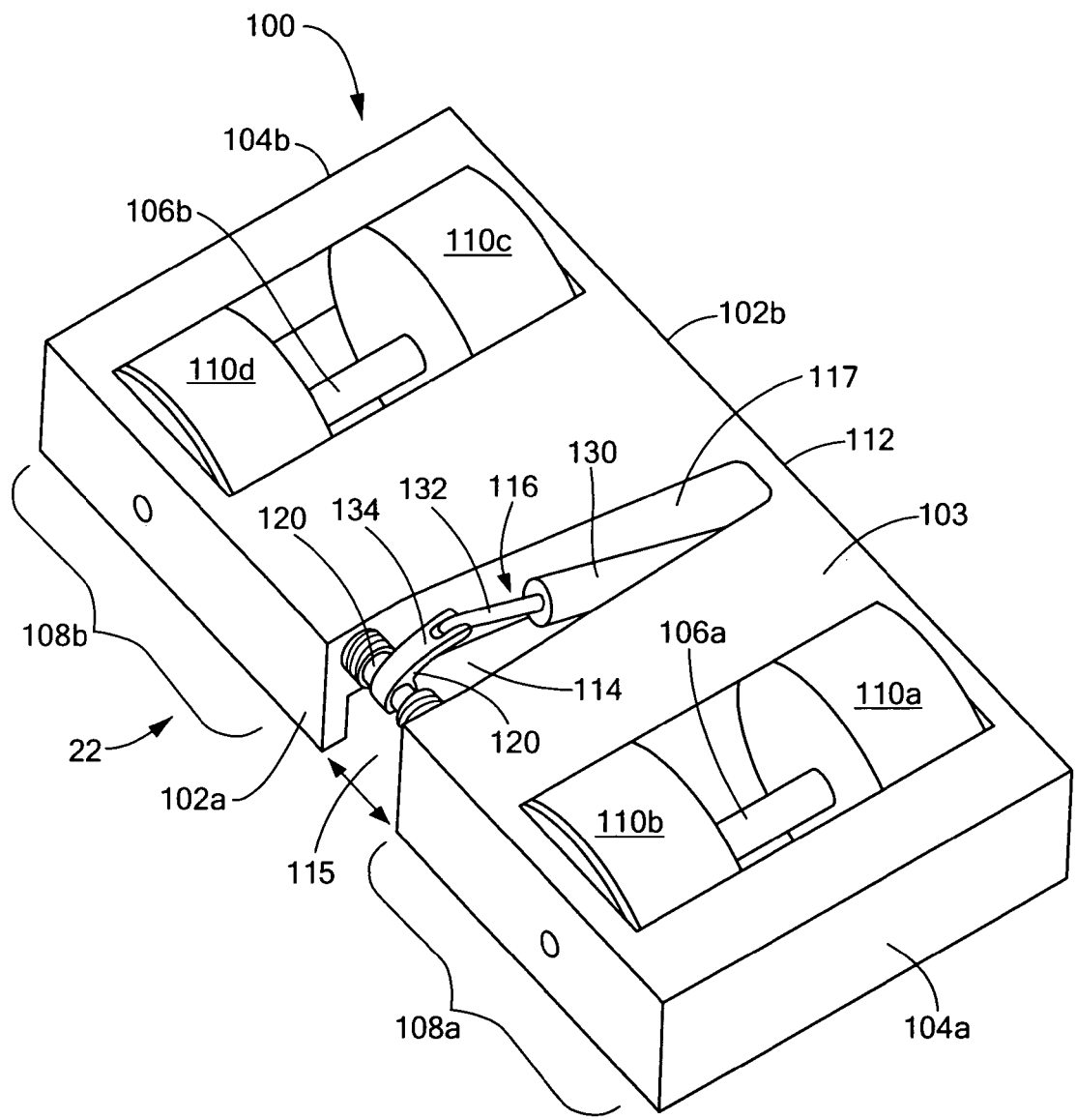
FIG. 3 is a schematic three-dimensional top view showing an example of a drive system in accordance with the invention.

FIG. 3 shows an example of drive system 22 in more detail. System 22 includes frame 100 with spaced side wall 102a and 102b interconnected by end walls 104a and 104b. Spaced axles 106a and 106b, in this example, are rotatably disposed between side walls 102a and 102b such that frame 100 defines first frame portion or section 108a housing axle 106a and second frame portion 108b houses axle 106b. Axles 106a, 106b support, in this particular example, wheels such as spaced magnetic wheels 110a and 110b on axle 106a and spaced wheels 110c and 110d on axle 106b. By wheels, as disclosed herein, we mean wheels in the conventional sense, drum shaped wheels (also referred to as rollers), and even a pair of spaced wheels, drums, or sprockets used, for example, in a magnetic track, and other rolling structures. For example, as disclosed herein, axle 106b can support a drum type wheel or there may be two spaced axles supported by frame section 108b supporting spaced drums or sprockets for a magnetic track housed by frame section 108b. The same is true with respect to frame section 108a. One example of a magnetic track module is discussed in reference to FIGS. 15-25.

In the example shown in FIG. 3, frame 100 defines pivotable, bendable, and/or flexible joint 112 between frame portion 108a and frame portion 108b. Stated another way, frame 100 includes expandable and contractable portion 114 between frame portions 108a and 108b. In this particular example, joint 112 is a section of frame side wall 102b and portion 114 comprises a gap 115 in frame 100 side wall 102a and gap 117 in top wall 103 between metal frame portions 108a and 108b. Joint 112 in this particular example is a portion of the frame side wall 102b which can be bent when desired. Joint 112 spans gap 117 which, in the illustrated embodiment, narrows from a wide end near side wall 102a to a more narrow end near side wall 102b. Joint 112 is, in this example, a locally flexible integral portion of an otherwise stiff frame side wall 102b and top wall 103 and can bend a few degrees.

Actuator subsystem 116 is configured to move frame portion 108a relative to frame portion 108b and flex joint 112 while expanding and contracting expandable gaps 115 and 117 in the direction shown. This action, in turn, angles first axle 106a relative to second axle 106b and turns the drive and the robot it is attached to. If axles 106a and 106b are, for example, a foot apart, the turning radius can be between 5 to 40 feet, which is sufficient for operation on the hull of a ship.

Figure 4:
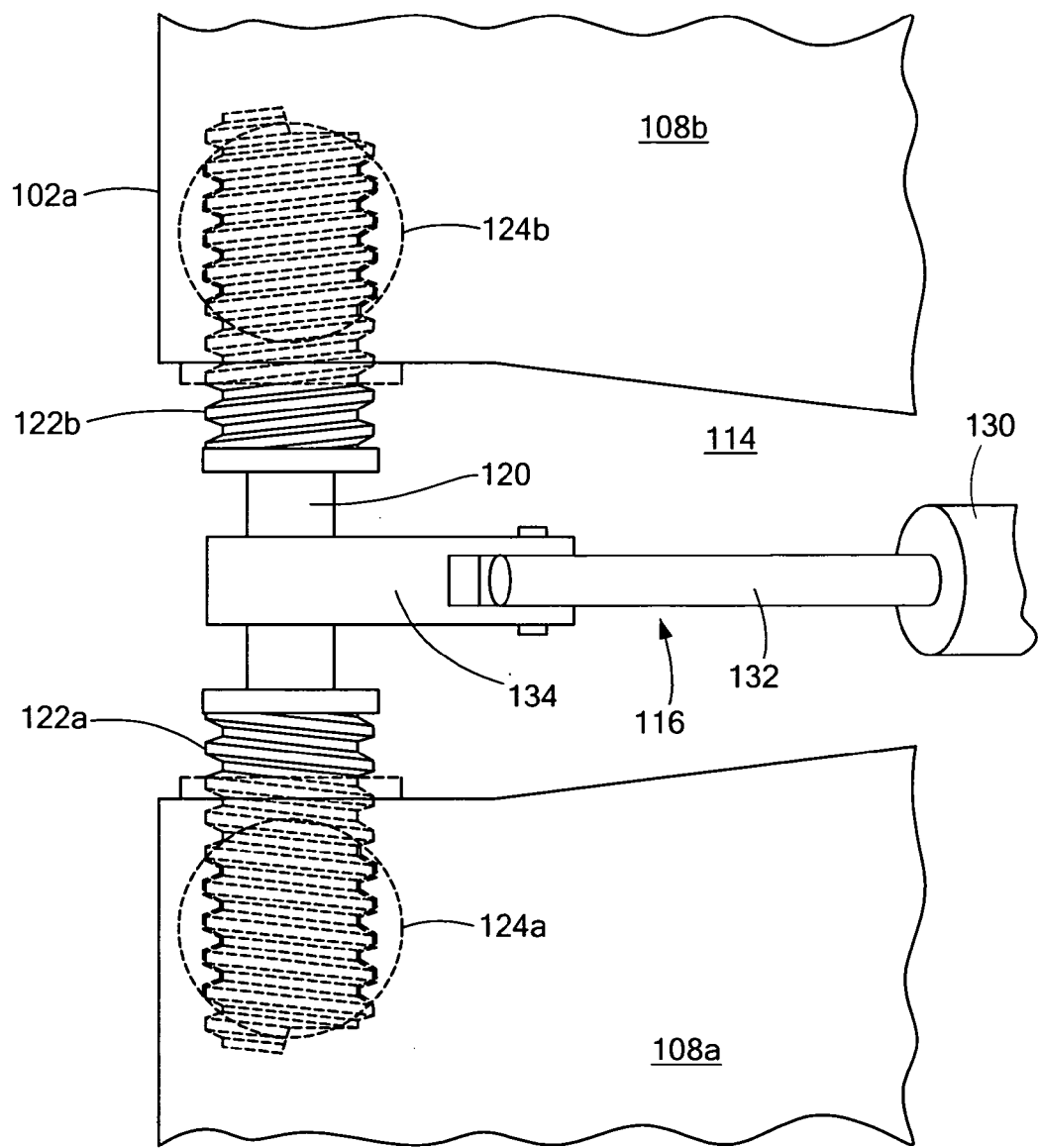
FIG. 4 is a schematic top view showing in more detail a portion of the actuator subsystem for the robot drive shown in FIG. 3.

In this particular example, actuator subsystem 116 includes shaft 120, FIG. 4 with threads 122a extending into a threaded orifice in frame portion 108a and threads 122b on the other end extending into a threaded orifice in frame portion 108b. Threads 122a and 122b are in different directions so turning shaft 120 in one direction expands gap 114 and turning shaft 120 in the opposite direction contracts gap 114. To reduce any stress on shaft 120, rotating barrel nuts 124a, 124b may be incorporated in frame portions 108a, 108b, respectively, to receive the threads on the opposite ends of the shaft.

Piston 132 driven in and out of cylinder 130 is coupled to shaft 120 via pivoting joint 134. In this way, actuating cylinder 130 rotates shaft 120. Cylinder 130 is typically coupled to the frame, (see FIG. 7) at or near joint 112. The combination of cylinder 130 and piston 132 may be an electrically driven linear actuator as is known in the art or a pneumatically drive subsystem as is also known in the art. Typically, the electricity required for actuator subsystem 116 is provided by generators 28a and/or 28b, FIGS. 1-2 via, for example, a battery subsystem.

Figure 5:
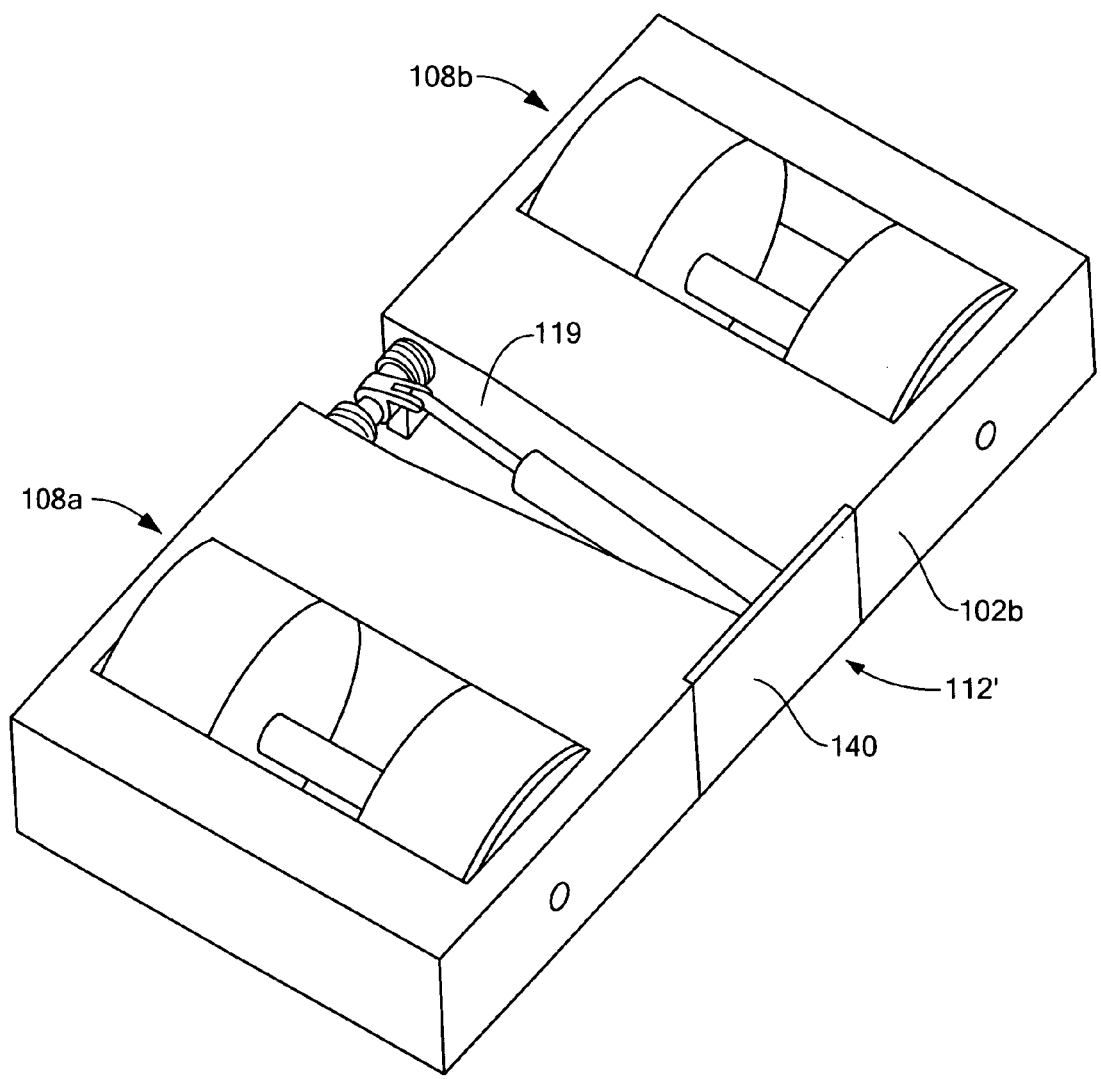
FIG. 5 is a schematic three-dimensional top view showing another example of a robot drive in accordance with the subject invention.
Figure 6:
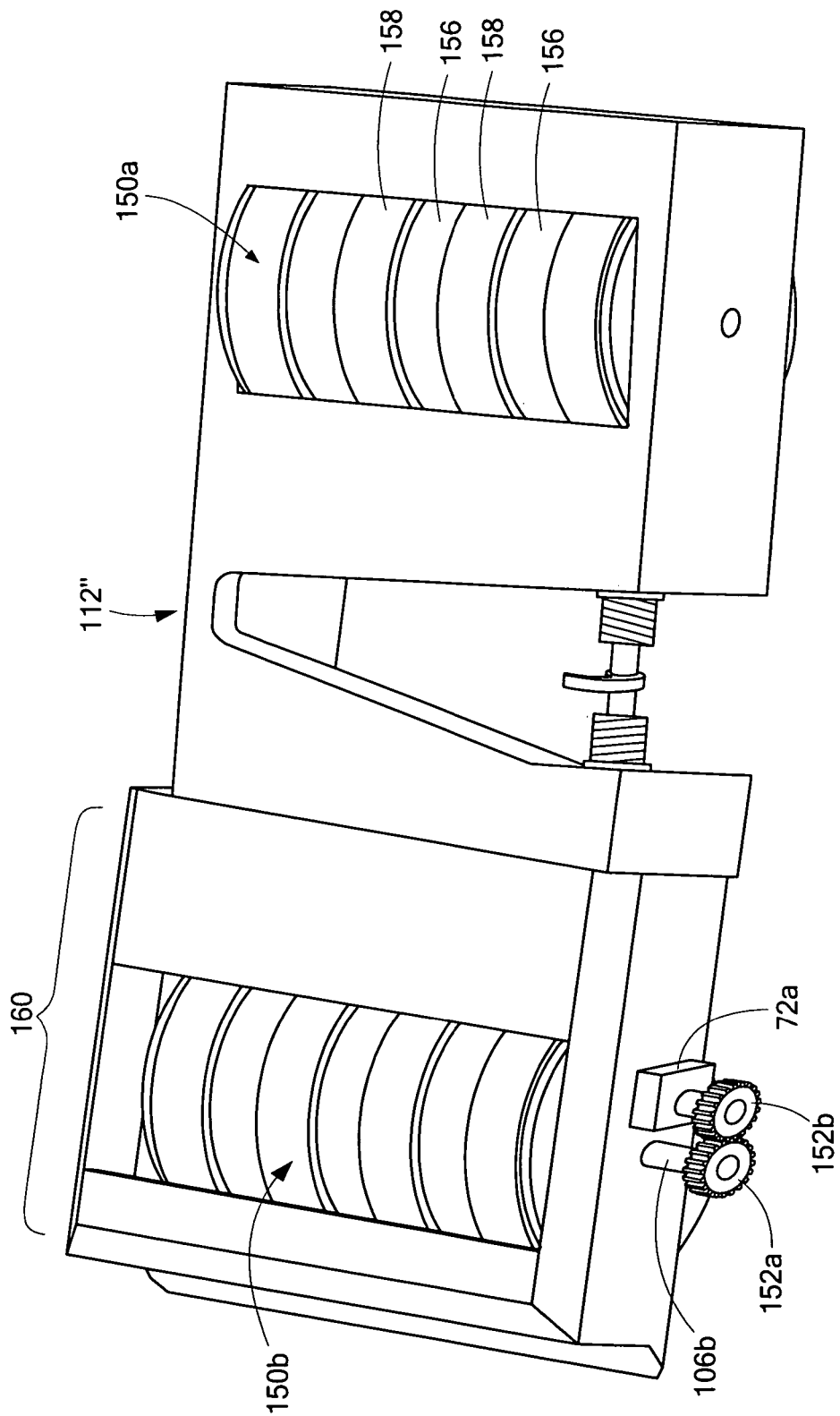
FIG. 6 is a schematic three-dimensional top view showing an embodiment of a robot drive system in accordance with the invention including two roller wheels.

FIG. 5 shows an example where frame portions 108a and 108b are interconnected at side wall 102b via joint 112' flexure 140 which spans the narrow end of gap 119 between the two frame sections. In FIG. 6, the spaced axles support drum shaped magnetic wheels 150a and 150b. Roller 150b, in this example, is driven via a propulsion subsystem which includes motor 72a driving axle 106b via gears 152a and 152b. Electricity for motor 72a also can be provided by generators 28a and/or 28b, FIGS. 1-2, via the battery subsystem.

Rollers 150a and 150b are magnetic and may include bands of alternating magnetic material 156 and ferromagnetic material 158 for directing magnetic flux into the hull. FIG. 6 also shows how second frame portion 150b includes module 60 housing axle 106b and roller 150b. Module 60 may also house a magnetic track as disclosed herein.

Figure 7:
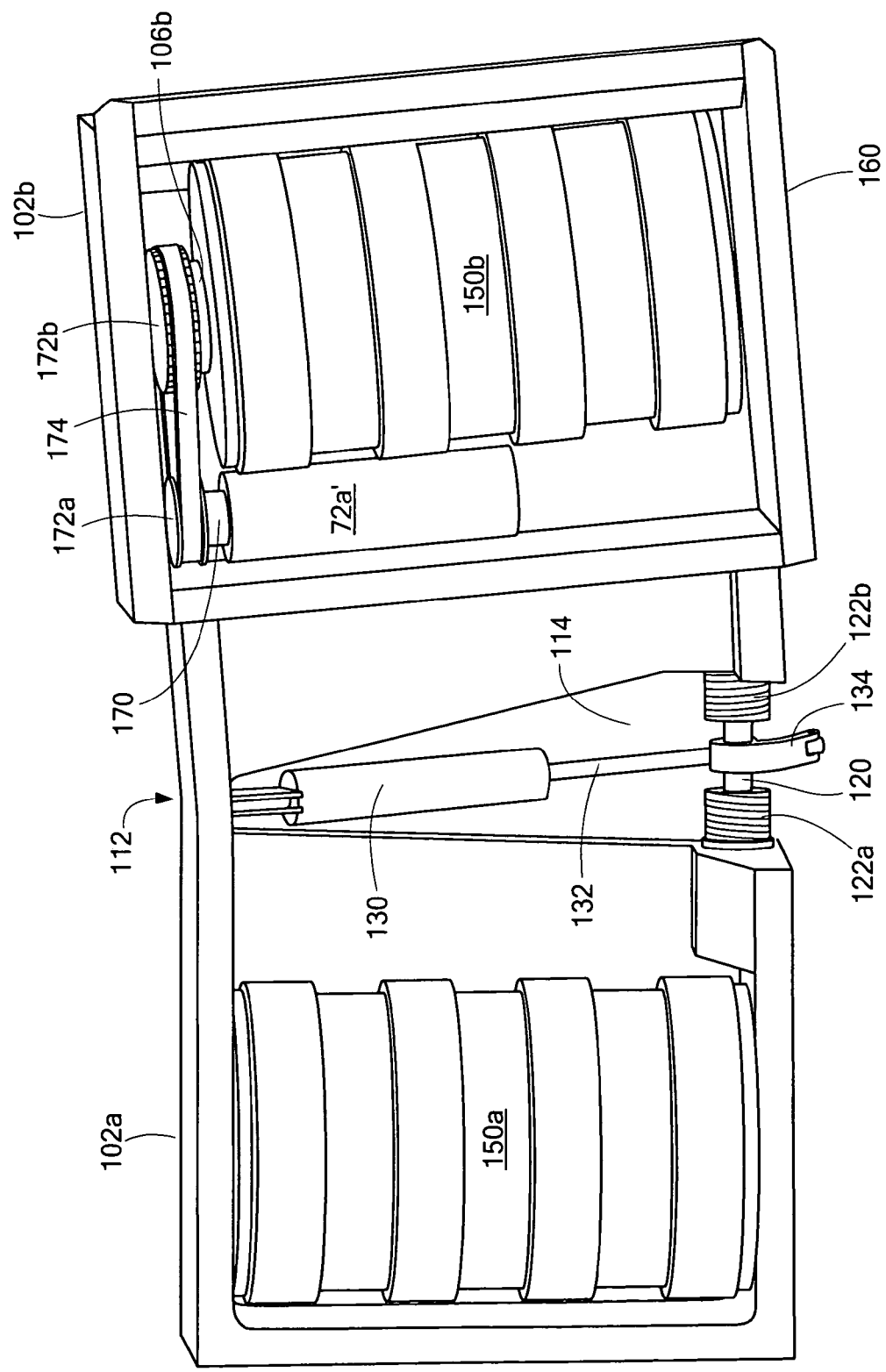
FIG. 7 is a schematic three-dimensional bottom view showing an example of a motorized propulsion subsystem in accordance with the invention.

FIG. 7 shows an alternative arrangement where the propulsion subsystem includes motor 72a' with drive shaft 170 and a drive train between drive shaft 170 and roller wheel 150b including pulley 172a on drive shaft 170, pulley 172b coupled to axle 106b, and belt 174 about pulleys 172a and 172b. Again, electricity for powering motor 172a is typically provided by generators 28a and/or 28b, FIG. 1. Alternative propulsion subsystems are within the scope of the invention.

Figure 8:
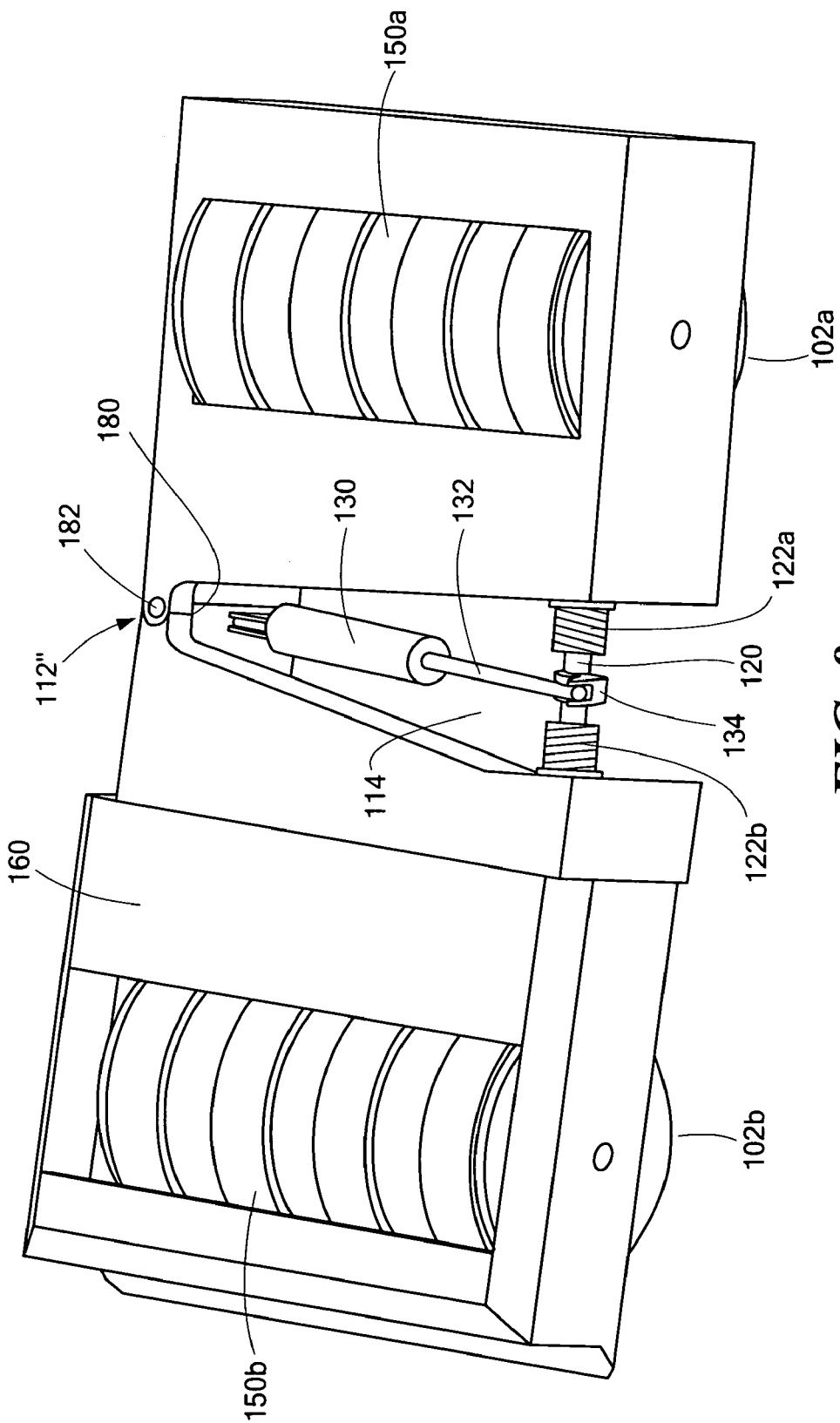
FIG. 8 is a schematic three-dimensional view of a robot drive in accordance with the invention showing a hinged joint between two frame portions.

FIG. 8 shows an example of where joint 112" includes hinge 180 with hinge pin 182 between frame sections 102a and 102b each of which include a portion of the hinged joint.

Figure 9:
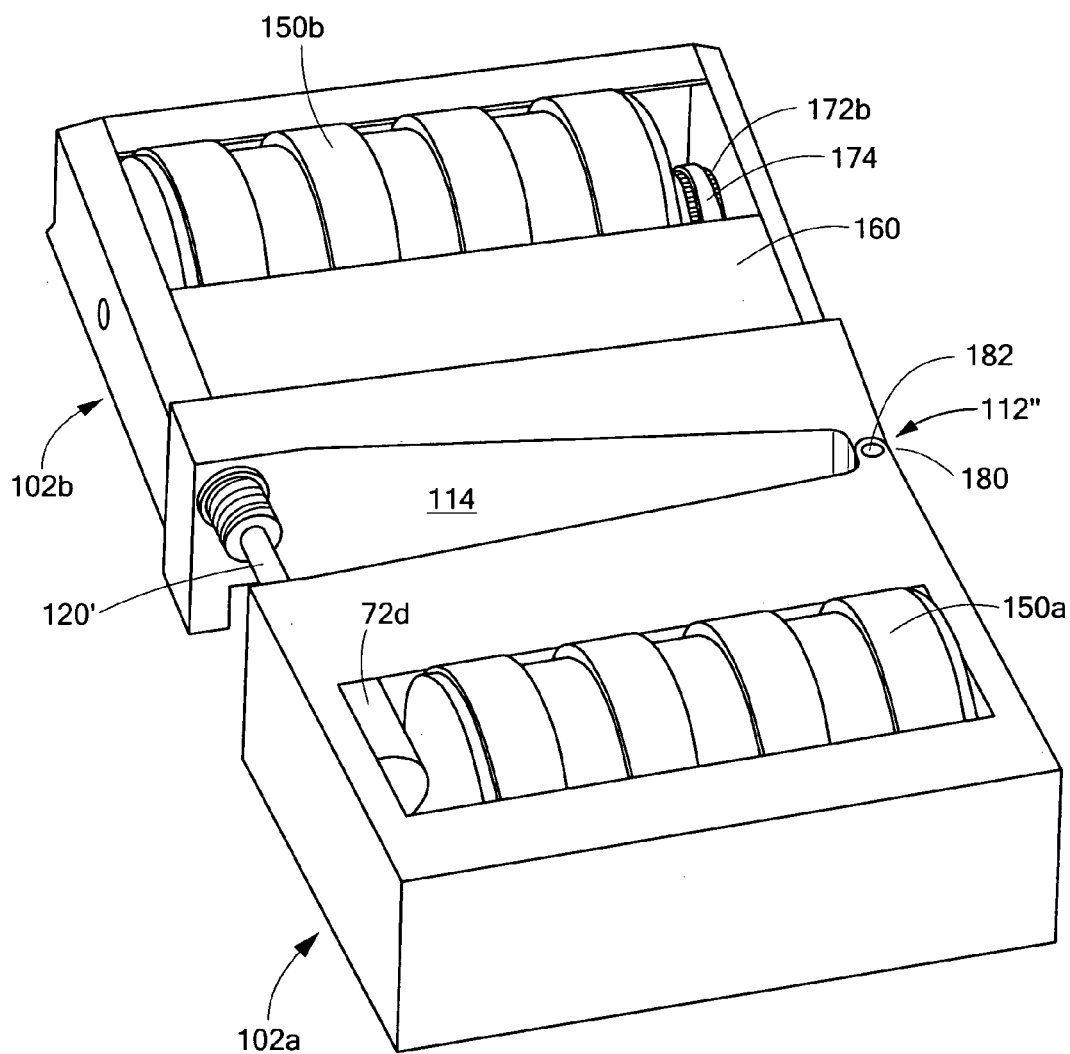
FIG. 9 is a schematic three-dimensional top view showing another example of an actuator subsystem in accordance with the invention.

In another design, motor 72d, FIG. 9 is associated with frame portion 102a and drive shaft 120' is threaded into frame portion 102b. Operating motor 72d in one direction expands gap 114 and operating motor 72d in the opposite direction contracts gap 114 angling roller 150a relative to roller 150b. Motor 72d is typically powered by electricity supplied via generators 28a and/or 28b, FIGS. 1-2.

Figure 10A:
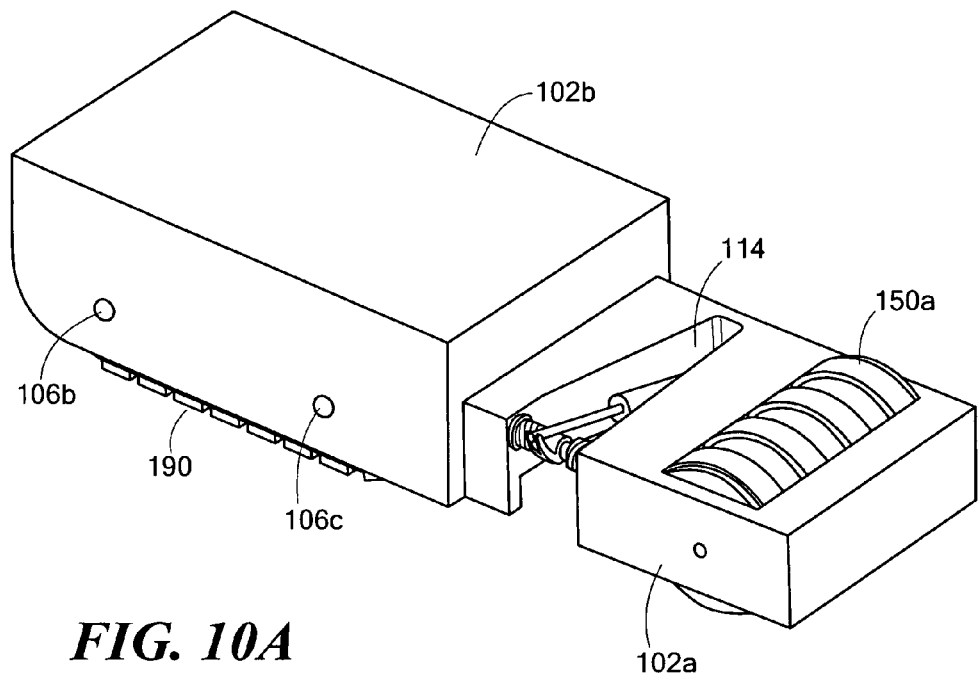
FIGS. 10A and 10B are schematic views showing an example of a robot drive incorporating a magnetic track.
Figure 10B:
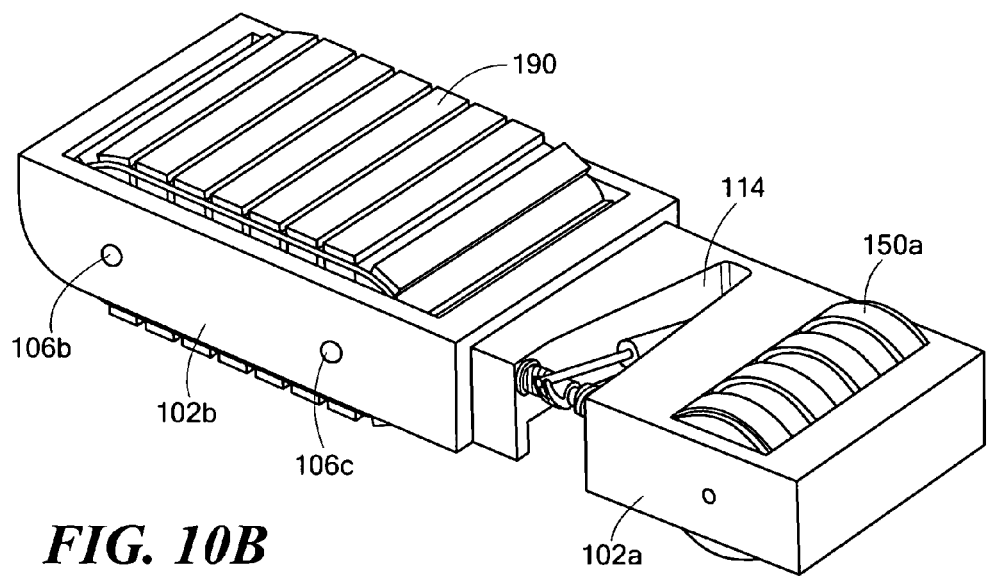

If a magnetic track is desired, FIGS. 10A-10B depict how frame portion 102b includes two spaced axles 106b and 106c supporting drums, sprockets, or the like for driving magnetic track 190.

Figure 11:
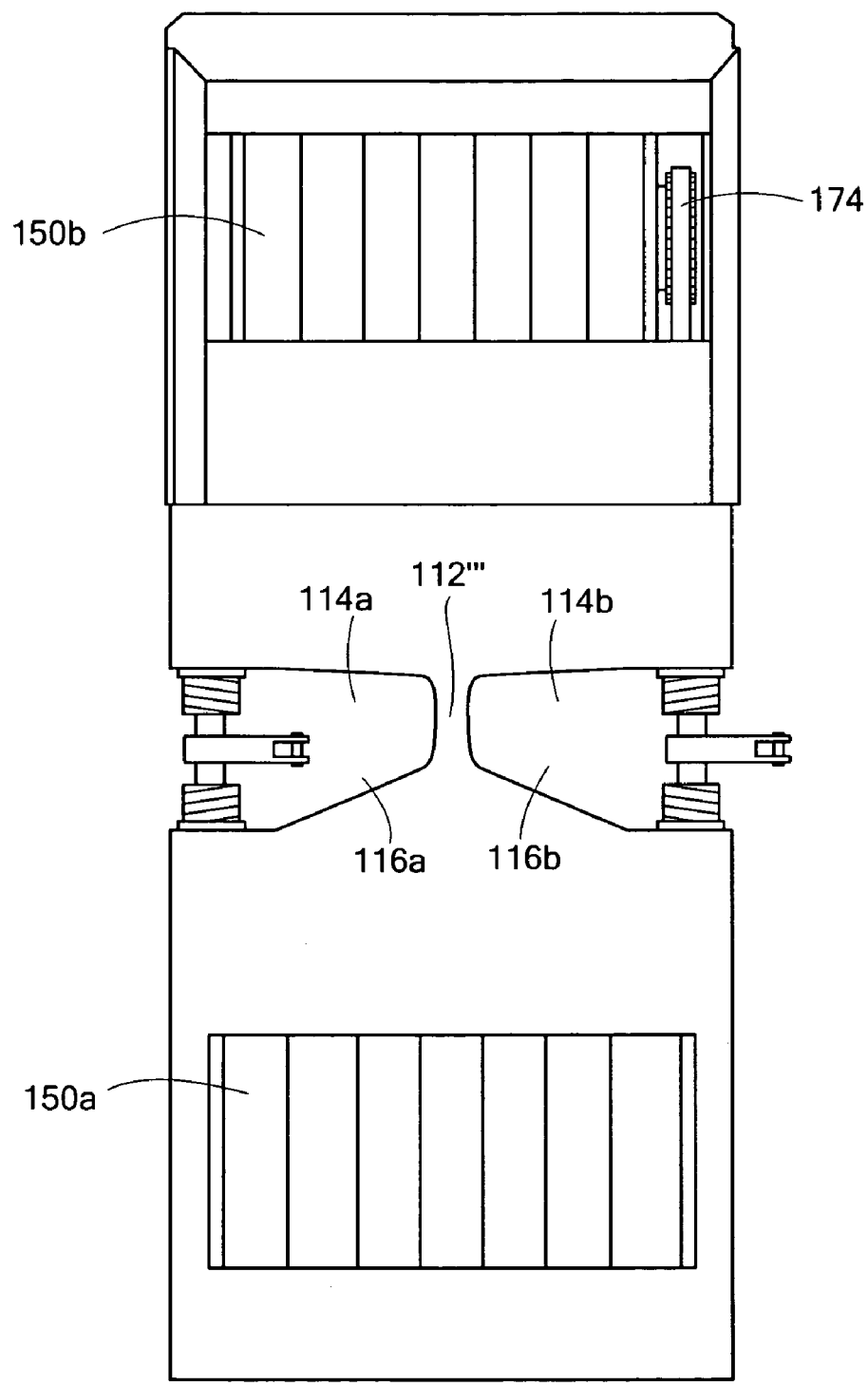
FIG. 11 is a schematic top view showing an example of another robot drive frame configuration in accordance with the invention.

In the design shown in FIG. 11, joint 112''' is a flexible frame section located interior of the frame side and end walls. There may now be two adjustable expandable and contractable sections 114a and 114b and two actuator subsystems 116a and 116b. The result, in this design, is a smaller turning radius. Gap 114a may be contracted while gap 114b is expanded and vice versa.

Figure 12:
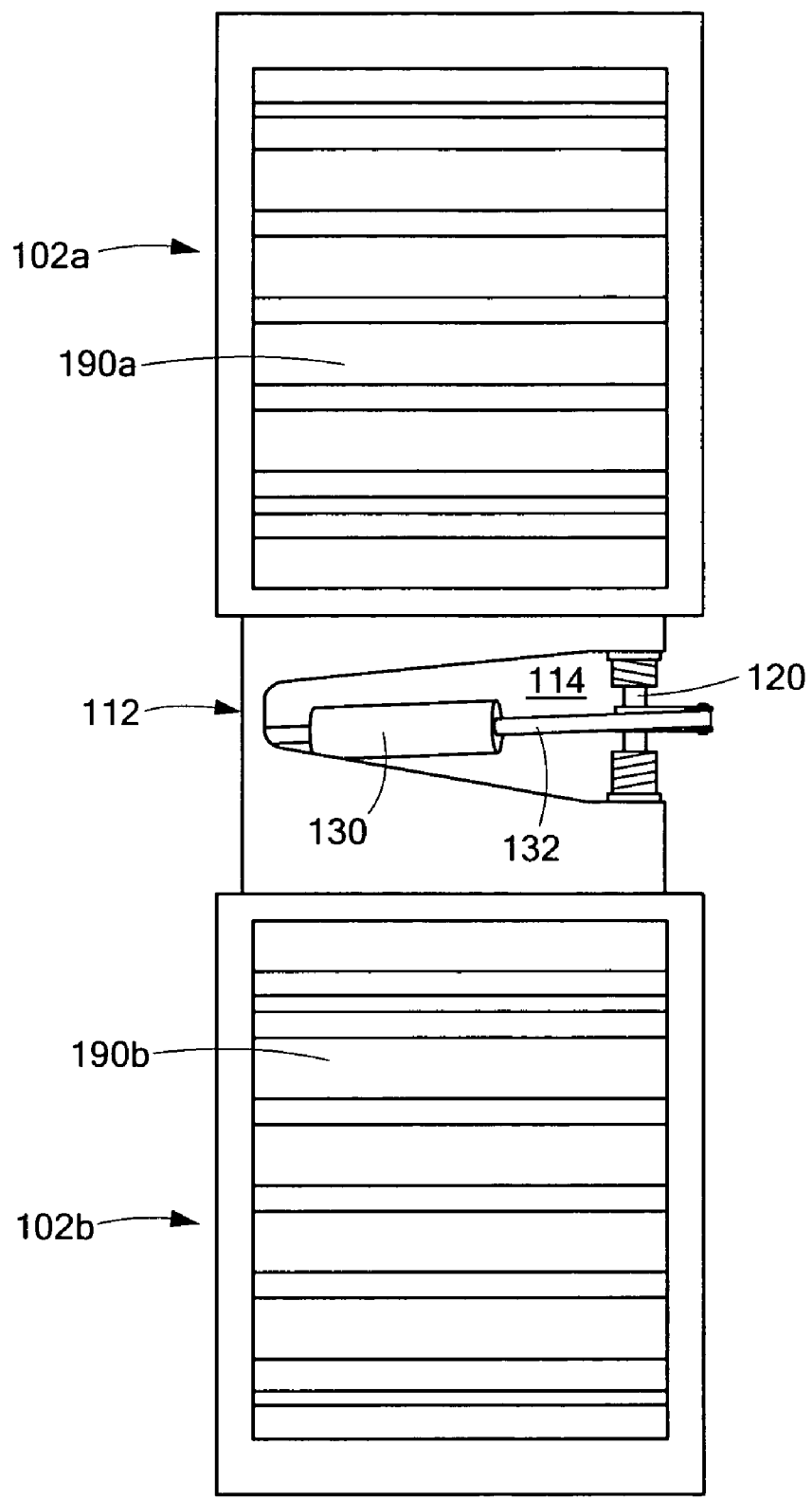
FIG. 12 is a schematic three-dimensional top view showing an example of a robot drive with two magnetic tracks.
Figure 13:
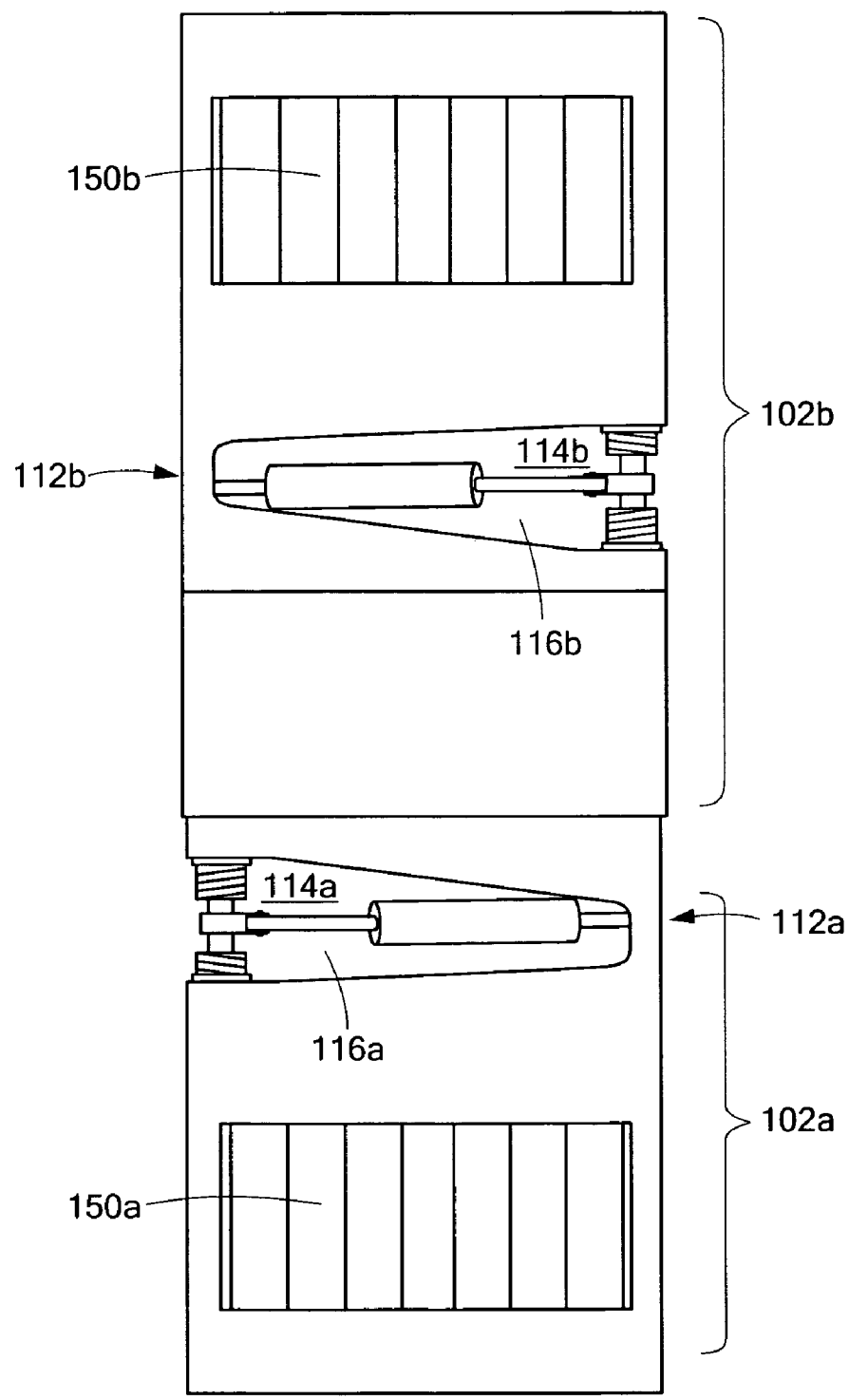
FIG. 13 is a schematic top view showing still another example of a robot drive in accordance with the invention.

FIG. 12 shows an example with two magnetic tracks 190a and 190b one each associated with frame portion 102a, 102b, respectively. FIG. 13 shows an example where frame section 102b includes a second joint 112b and actuator subsystem 116b for joint 112b. Joint 112a is between frame portion 102a and 102b and is associated with actuator subsystem 116a.

The novel drive system of the invention is thus highly versatile and can incorporate numerous different features and combinations.

Figure 14:
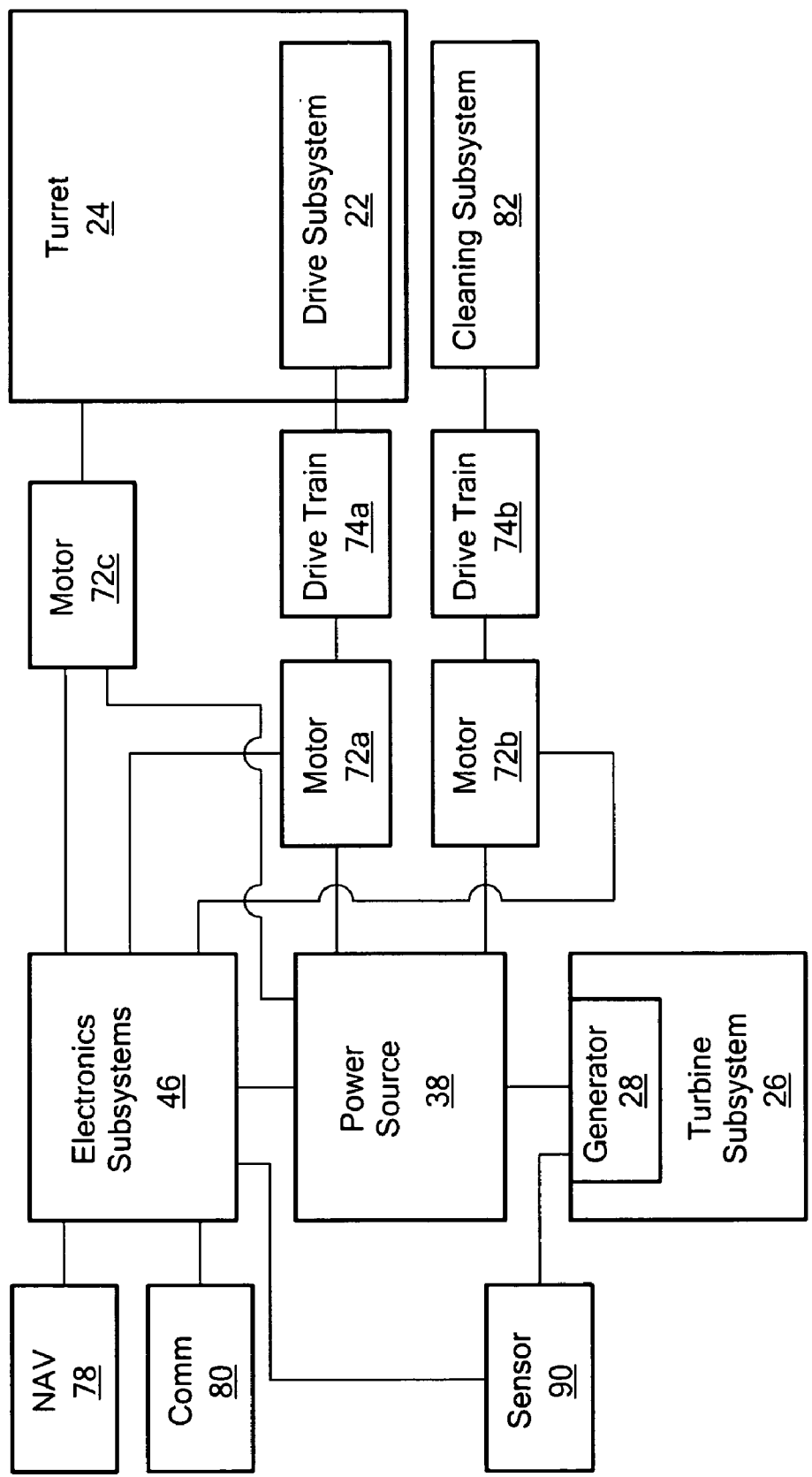
FIG. 14 is a block diagram showing several of the primary components associated with a typical hull robot in accordance with the invention.

FIG. 14 illustrates an example where turbine subsystem 26 (see turbines 26a and 26b, FIG. 1) are actuatable by fluid flowing past the hull when the vessel is underway. Generators 28 recharge power source 38 which may include one or more batteries. One or more motors are powered by power source 38. Typically, motor 72b (See FIG. 2.) is coupled to the cleaning subsystem 82 which may comprise a number of rotatable brushes as shown in FIG. 2 via drive train 74b. One or more motors 72a are associated with drive subsystem 22 mounted to turret 24. For example, as discussed above, there is typically one motor for one of the drive wheels, rollers, or sprockets and also at least one motor associated with the actuator subsystem of the robot drive. As shown in FIGS. 1 and 14, motor 72c is typically associated with turret 24 for rotating the same. The direction of travel of the robot as well as actuation of the propulsion subsystem and the actuator subsystem to turn the robot is controlled by electronic control subsystem 46, FIG. 14. Operation of the propulsion subsystem, turret, and actuator subsystem can be based on inputs, for example, from navigation subsystem 78 and/or communications subsystem 80 and/or one sensors 90. See U.S. patent application Ser. No. 12/313,643 incorporated herein by this reference.

Figure 15:
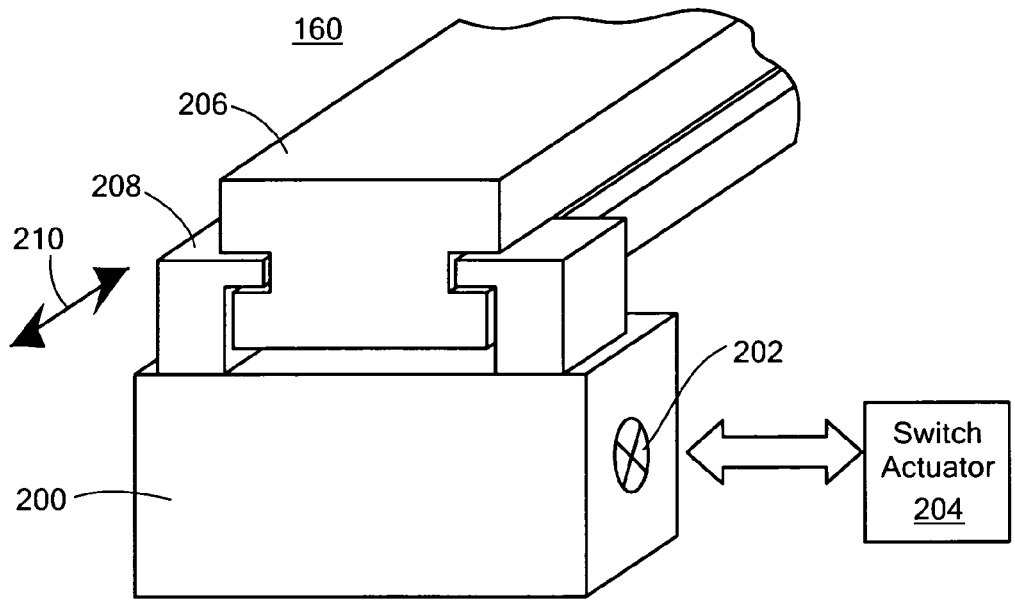
FIG. 15 is a schematic three-dimensional partial front view showing several of the components associated with an example of a magnetic track drive module.

FIG. 15 schematically depicts certain components of a version of a magnetic track module for the drive. There are typically a plurality of permanent magnet elements such as element 200. Switch assembly 202 switches element 200 between a shunted and a non-shunted state. Actuator 204 actuates switch 202 typically between a shunted state when element 200 is not adjacent the vessel hull and a non-shunted state when element 200 is adjacent the vessel hull. Tunnel body 206 is configured to constrain the movement of element 100 which typically includes some type of carriage 208. There are also some means to drive tunnel body 106 with respect to permanent magnet element 200 as shown by arrow 210.

Figure 16:
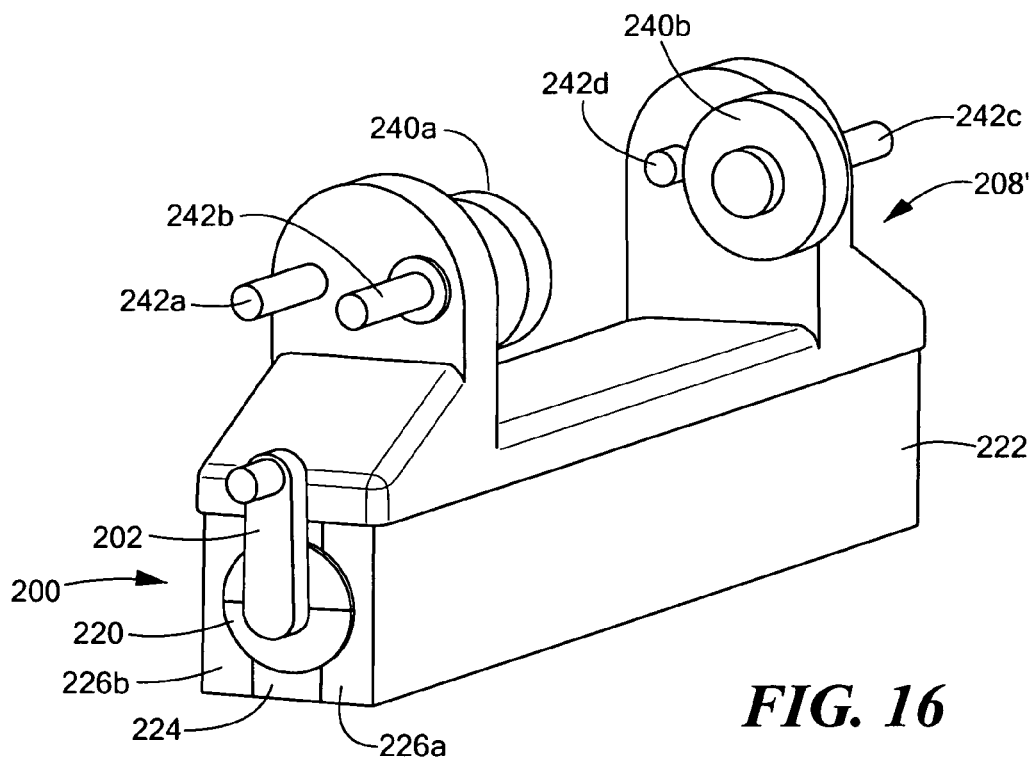
FIG. 16 is a schematic three-dimensional front view showing one example of a switchable permanent magnetic element associated with a drive module.
Figure 17:
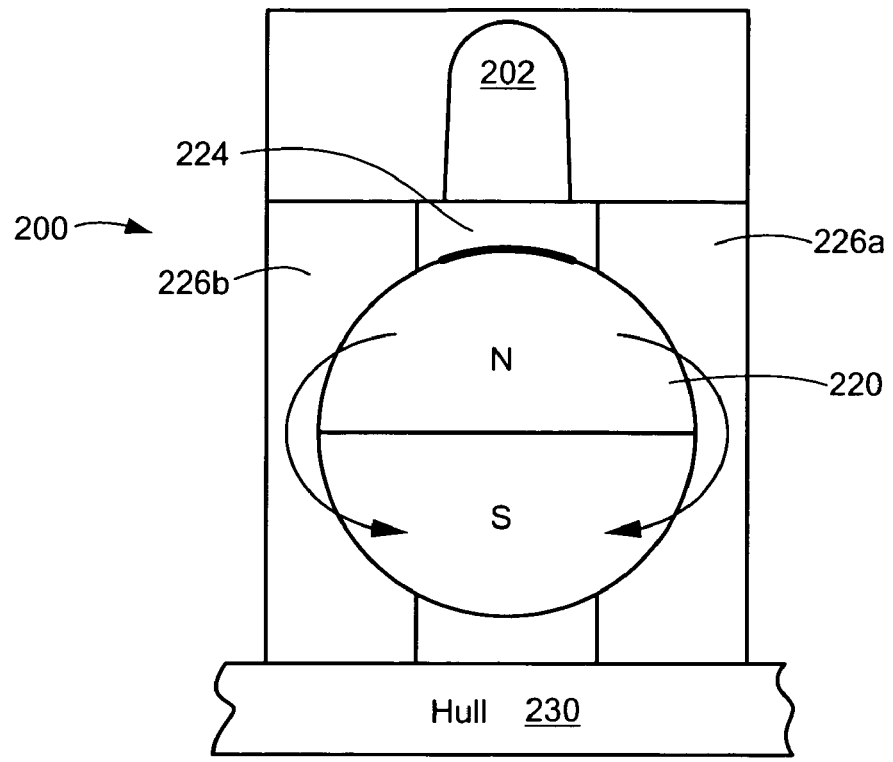
FIG. 17 is a schematic cross-sectional side view showing the permanent magnet element of FIG. 16 in its shunted state.
Figure 18:
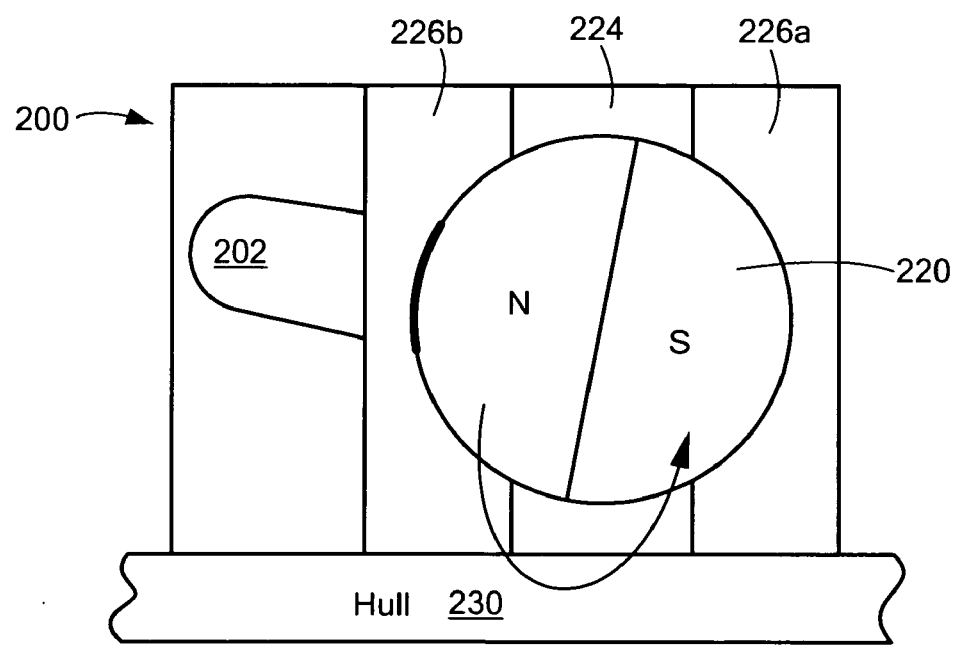
FIG. 18 is a schematic cross-sectional side view showing the permanent magnet element of FIG. 16 in its non-shunted state.

FIG. 16 shows a design where permanent magnet element 200 includes diametrically polarized cylindrical magnet 220 rotatably disposed in a bore of housing 222. Housing 222 includes non-magnetic material 224 (e.g., aluminum, plastic, or the like) sandwiched between ferromagnetic material 226a and 226b (e.g., steel). Switch 202 is attached to cylindrical magnet 220 and rotates it as shown in FIGS. 17-18. In FIG. 17, magnet 220 is shunted since the magnetic field flows from the north pole, outwardly through ferromagnetic material 226a and 226b, and to the south pole. The attraction of magnet 220 to vessel hull 230 is thus minimized. Activating switch 202 rotates magnet 220 as shown in FIG. 7 so each pole is proximate ferromagnetic material 226a or 226b. As shown in figure, the south pole is in contact with ferromagnetic material 226a and the north pole is in contact with ferromagnetic material 226b. The magnetic field flows from the north pole of the magnet into body 226b, to the ship's hull 230, to body 226a, and then back to the south pole of the magnet. In this non-shunted state, the attraction of magnet 220 to hull 230 is maximized.

Typically, switch 202 is activated to shunt magnet 220 as permanent magnet element 200 reaches the end of its travel on the hull and switch 202 is again activated to actuate magnet 220 as permanent magnet element 200 again comes into contact with the hull. In this way, power usage is minimized and yet there is still a very strong tractive force provided to keep the robot on the hull. Power usage is minimized because power is not wasted in removing the individual permanent magnet elements from the hull. Also, damage to the hull is minimized since the permanent magnet elements are not switched to their non-shorted states until they are actually in contact with the hull. Each permanent magnet element may include a protective covering to also reduce damage to the vessel hull. The intent is to control the holding force exerted by the magnets but at the same time use permanent magnets which consume no power unlike electromagnets.

Figure 19:
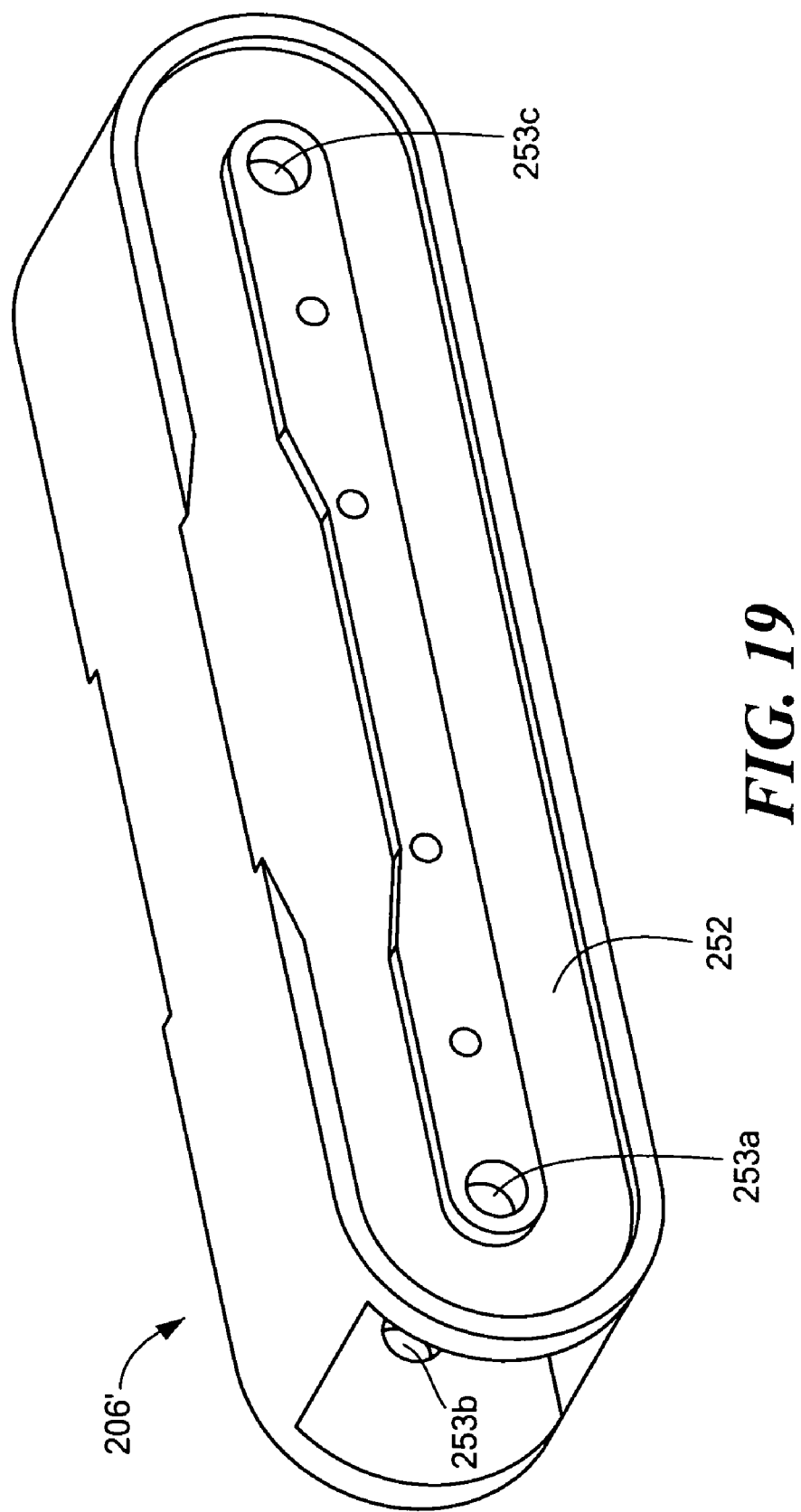
FIG. 19 is a schematic three-dimensional side view of an example of a tunnel body constraining the individual permanent magnet elements.

FIG. 16 also shows carriage 208' with spaced rotating bearings 240a and 240b and connectors 242a-242d. Bearings 240a and 240b ride in side tracks in tunnel body 206', FIG. 19. In FIG. 19, oval shaped side track 252 is shown. One axle is typically disposed through orifices 253a and 253b in body 206' and another axle is typically disposed through orifices 255c and another orifice, not shown.

Figure 20:
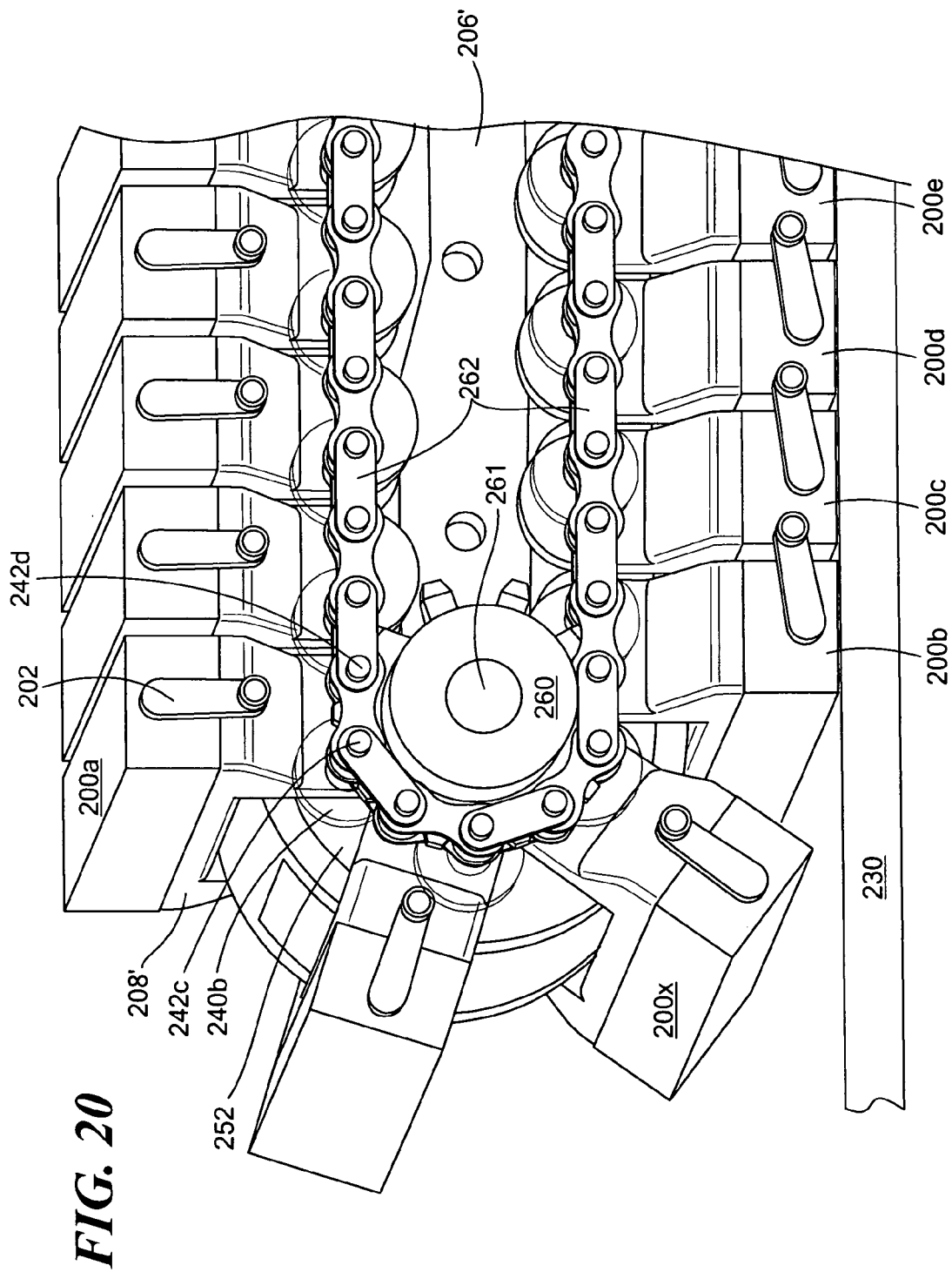
FIG. 20 is a schematic three-dimensional side view showing an example of a portion of the mechanism which drives the tunnel body relative to the permanent magnet elements.

FIG. 20 shows how tunnel body 206' supports a drive train such as spaced sprocket wheels including wheel 260 on axle 261 (which may be driven by motor 72a and drive train 74a, FIG. 14). Chain 262 extends around the spaced sprocket wheels. Bearing 240b of carriage 208' of permanent magnet element 200a is constrained in track 252 of tunnel body 206' and connectors 242c and 242d extend into chain 262.

Since tunnel body 206' is coupled to the robot body, and since permanent magnet elements 200b-200e in their non-shunted states are strongly attracted to the vessel hull, chain 262 actually drives tunnel body 206' forward (and rearward) and thus the robot body is driven with respect to the vessel hull via the rotation of chain 262 and about sprocket 260 and a similar sprocket at the other end of the tunnel body. Both sprockets are on axles typically housed by one of the drive frame portions, e.g. frame portion 102b, FIG. 12.

FIG. 20 also shows that permanent magnet element 200a is shunted via the position of switch 202. Permanent magnet element 200x is either an element first coming into position to be attracted to the hull 230 or it is leaving hull 230 depending on the direction of robot travel. If permanent magnet element 200x is just coming into position to be attracted to hull 230, it is switched from the shunted position shown to its non-shunted position once permanent magnet element 200x occupies the position of permanent magnet element 200b. If permanent magnet element 200x is just leaving hull 230, or is about to leave the hull, it is switched into a shunted state just after it occupies the position of permanent magnet element 200b.

Figure 21:
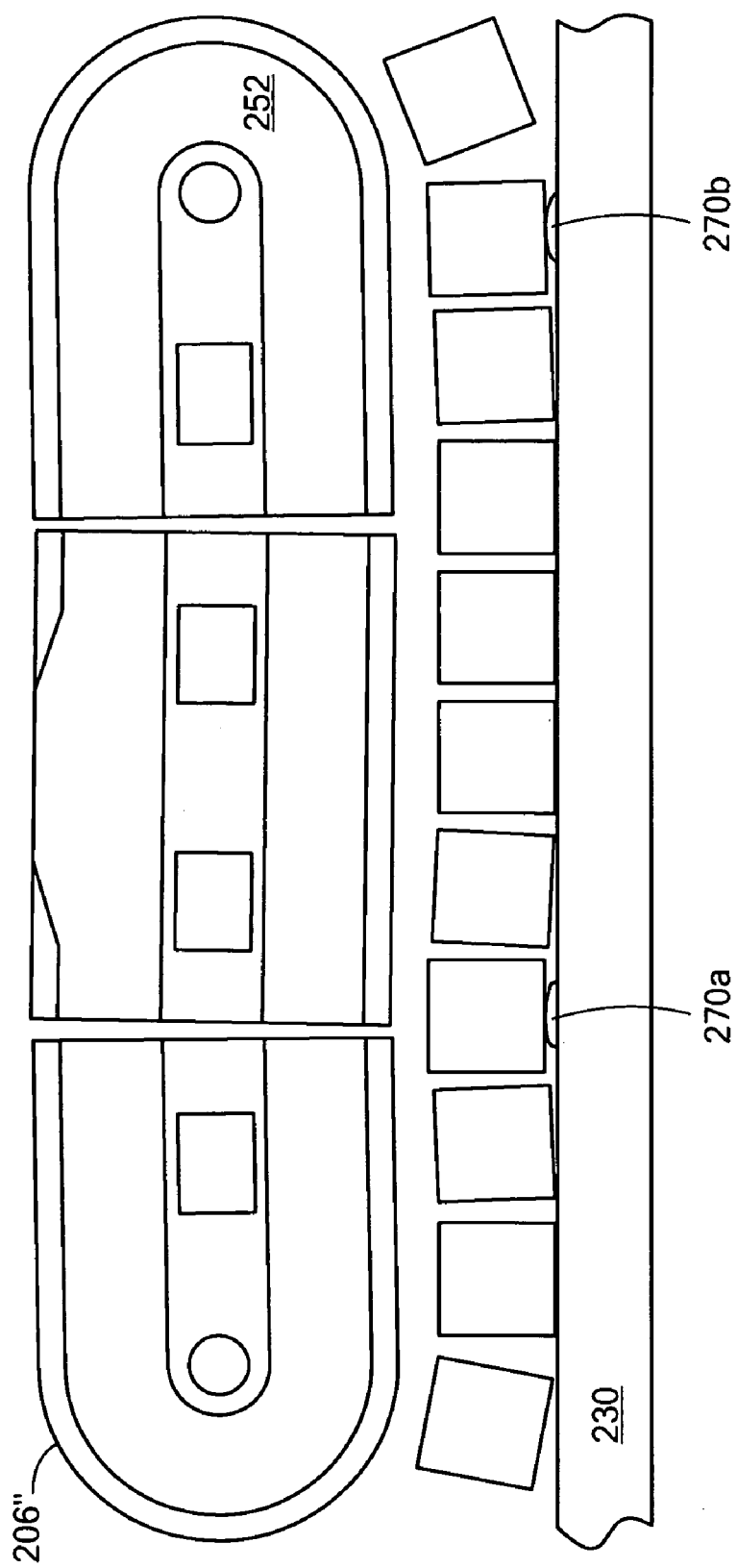
FIG. 21 is a schematic three-dimensional side view of a segmented tunnel body.
Figure 22:
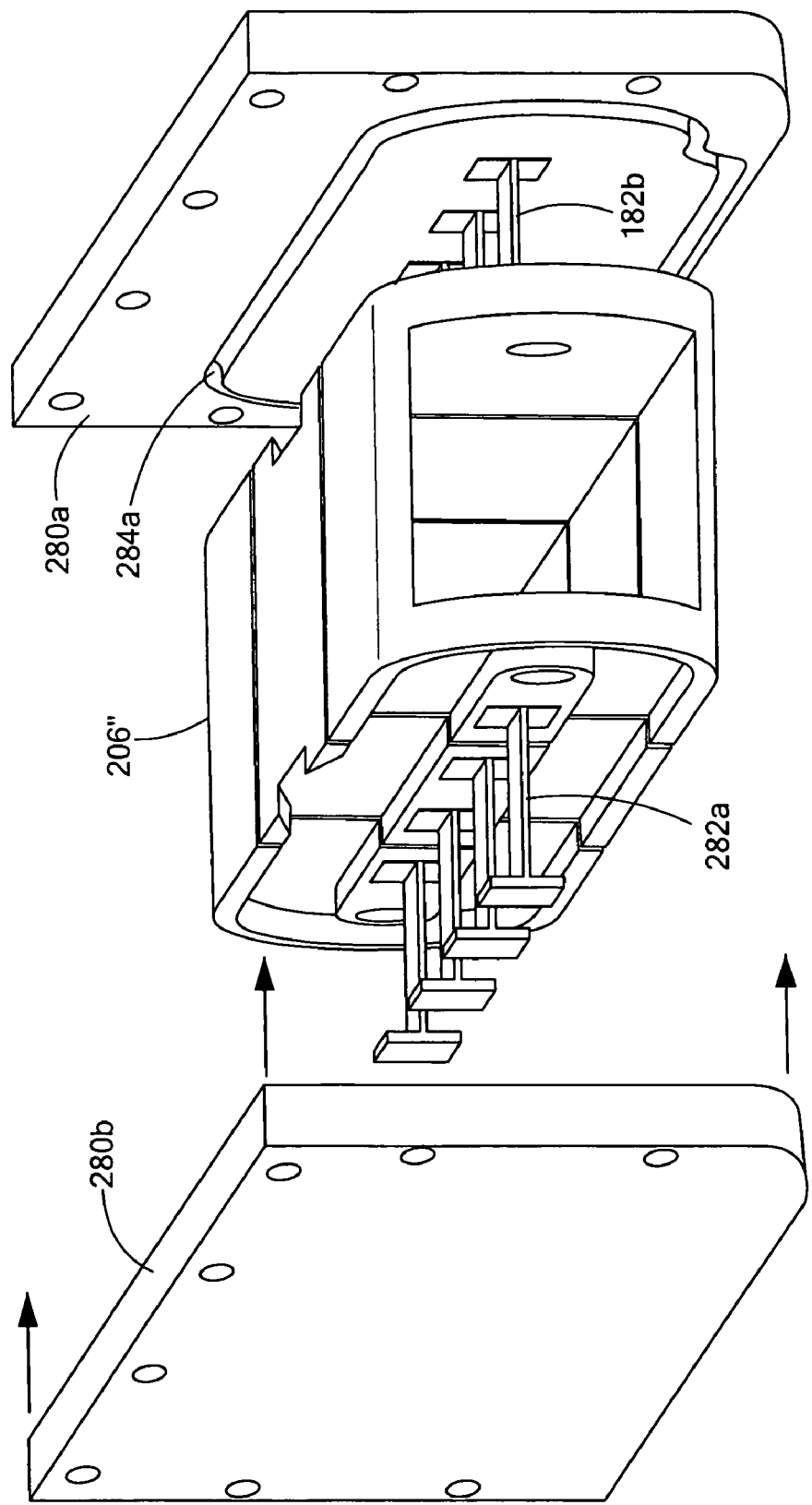
FIG. 22 is a schematic three-dimensional front view showing spaced side plate members flexibly supporting the segmented tunnel body shown in FIG. 21.
Figure 23:
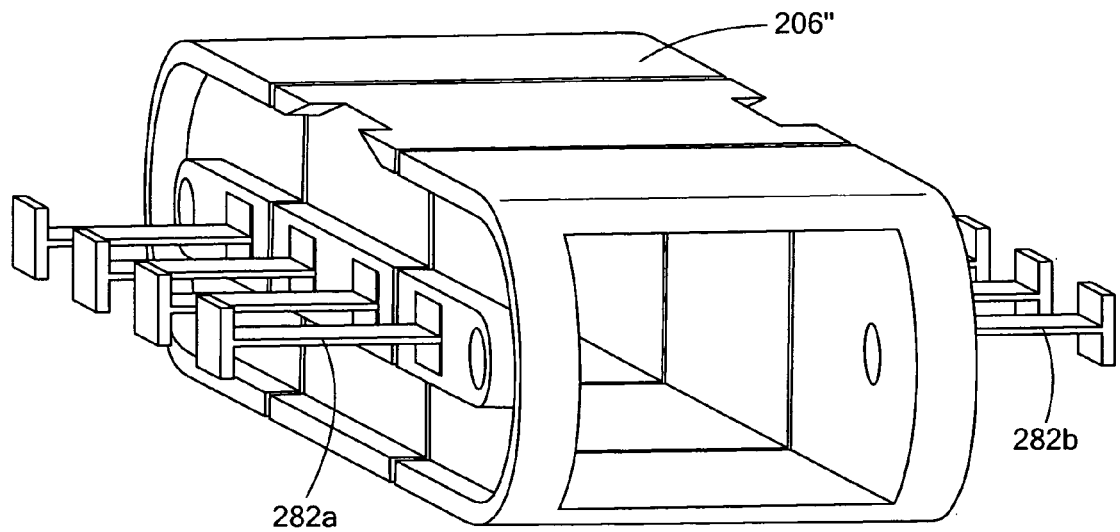
FIG. 23 is a schematic three-dimensional front view showing in more detail the flexure members of FIG. 22.

FIG. 21 shows a segmented design for tunnel body 206" to allow for articulation of the tunnel body and track system to maximize the contact area for each permanent magnet element in the presence of non-uniformities 270a and 270b on hull 230. In FIG. 22, spaced frame panels 280a and 280b support tunnel body 206" via flexures 282a, 282b, and the like, FIGS. 22-23. Typically, there is at least one flexure for each tunnel body segment as shown in FIG. 23. Side frame panels 280a and 280b are affixed to the robot body or to a turret rotatably attached to the robot body and are associated with one of the drive frame portions, e.g., frame portion 102b, FIG. 12.

Figure 24:
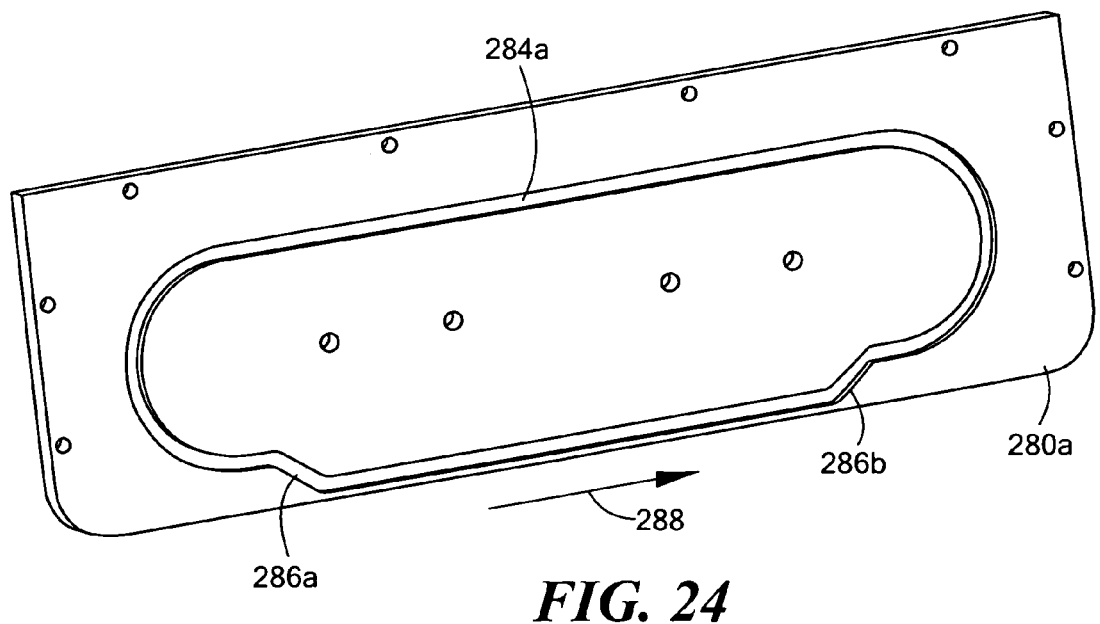
FIG. 24 is a schematic three-dimensional front view of the inside of one of the panels of FIG. 22.
Figure 25:
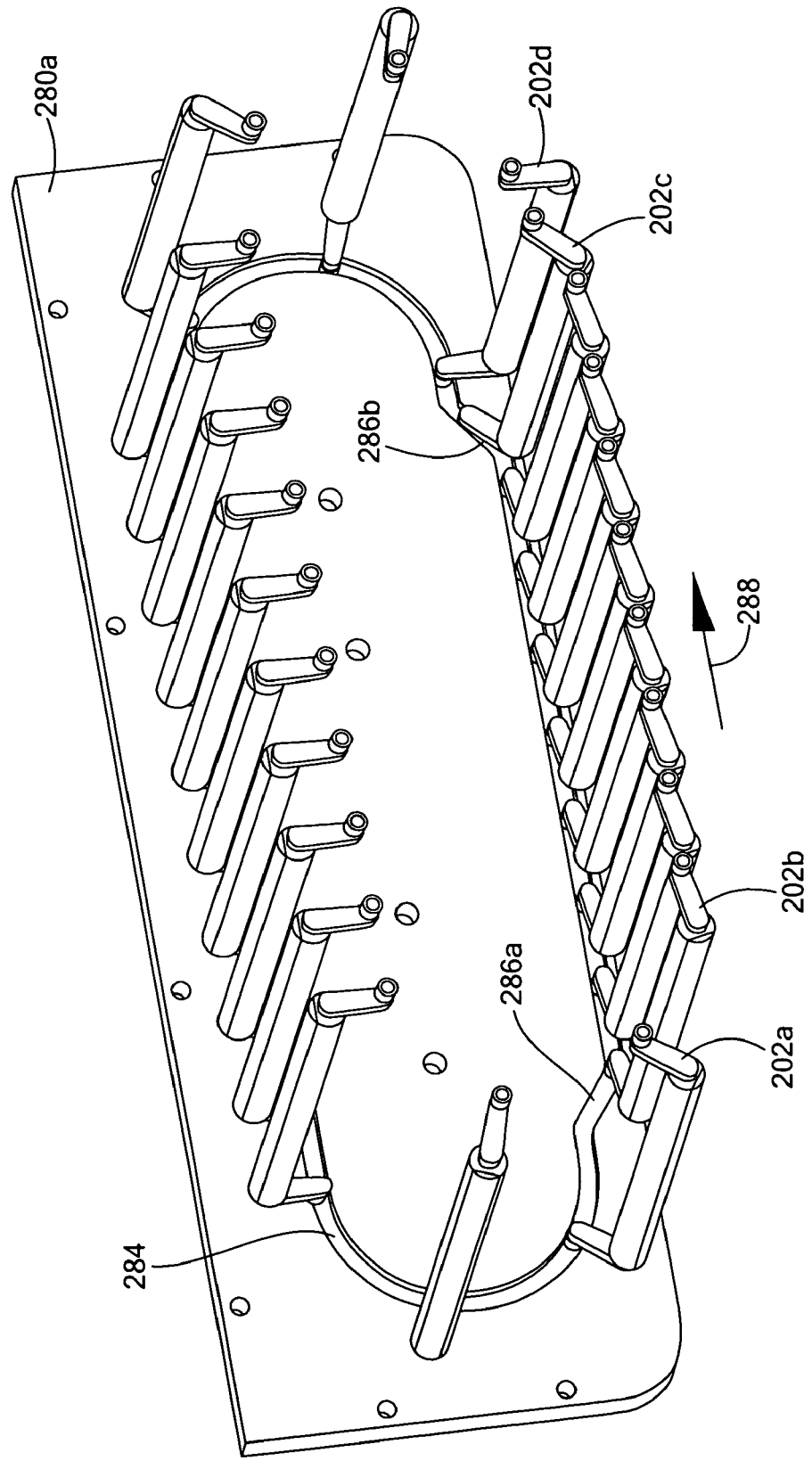
FIG. 25 is a schematic three-dimensional front view of the panels shown in FIG. 24 depicting how a feature in the panel acts as the switch actuator.

FIG. 22 also shows an actuation feature such as closed loop groove 284a on the inside of panel 280b. As shown in FIG. 24, these grooves in the side panels function to actuate the switches of the permanent magnet elements. At groove ends 286a and 286b there is a jog. If the direction of travel of the hull robot is as shown by arrow 288 and the vessel hull is at the bottom of the figure, jog 286b actuates the permanent magnet element switches to shunt the permanent magnet elements and at jog 286a the switches are actuated again to return the permanent magnet elements to their non-shunted configuration. FIG. 25 shows more complete switching assemblies 202a-202d and depicts how switch 202a is in its shunted position but switch 202b, via groove jog 286a, has been actuated to its non-shunted position. Similarly, jog 286b turns switch 202c to the shunted position for the remainder of its travel about the front and top of panel 280a corresponding to the front and top of tunnel body 206', FIG. 20.

In one preferred design, the tunnel body performs two functions: it constrains the movement of the permanent magnet elements and also serves to house the propulsion mechanism (e.g., a chain about two sprockets) connected to the carriages of the permanent magnet elements. This design also provides structural support against slack in the drive assembly. The side plates also serve two functions: they flexibly support the tunnel body and they include means for actuating the switches of the permanent magnet elements. In the preferred design, the magnetic elements are switched between their minimum tractive state and their maximum tractive state irrespective of the direction of travel of the robot. These are not limitations of the subject invention, however, as other designs are possible.

Other features associated with the typical hull robot are disclosed in the patents cited in the Background section hereof and incorporated herein by this reference. Also, U.S. patent application Ser. No. 12/313,643 filed Nov. 21, 2008 by the assignee hereof discloses additional features which may be associated with a hull robot. The drive system disclosed herein, however, is not limited to use in connection with such a vessel hull robot. The drive module, for example, can be used on any ferromagnetic body including but not limited to vessel hulls, underwater structures, and the like. "Hull," as used herein, then, broadly means a structure to be traversed.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A robot drive system comprising:
   a frame including:
      a first frame portion rotatably supporting a first axle with a first wheel thereon;
      a second frame portion rotatably supporting a second axle with a second wheel thereon, and
      a joint comprising a flexible member between the first frame portion to the second frame portion and defining an expandable and contractible portion between the first frame portion and second frame portion; and
   an actuator subsystem configured to expand and contract the expandable and contractible portion to move the first frame portion relative to the second frame portion at the joint to angle the first axle relative to the second axle to steer the robot.

2. The robot drive system of claim 1 in which the first and second axles each include a pair of wheels.

3. The system of claim 2 in which the wheels are magnetic.

4. The system of claim 1 in which the first and second wheels are drum shaped.

5. The system of claim 4 in which the drum shaped wheels are magnetic.

6. The system of claim 5 in which the drum shaped wheels include alternating magnetic and ferromagnetic material.

7. The system of claim 1 in which the second frame portion includes a module with spaced side walls for the second axle.

8. The system of claim 1 in which at least one of the first and second frame portions includes a propulsion subsystem.

9. The system of claim 8 in which the propulsion subsystem includes a motor with a drive shaft.

10. The system of claim 9 in which the propulsion subsystem further includes a drive train between the drive shaft and a wheel.

11. The system of claim 10 in which the drive train includes a first pulley coupled to said wheel, a second pulley coupled to the drive shaft, and a belt about the first and second pulleys.

12. The system of claim 1 in which the actuator subsystem includes a shaft including threads in one direction on a first end and threads in an opposite direction on a second end.

13. The system of claim 12 in which the first end of the shaft extends into a threaded orifice of the first frame portion and the second end extends into a threaded orifice of the second frame portion.

14. The system of claim 13 in which the threaded orifices include barrel nuts therein.

15. The system of claim 13 in which the actuator subsystem further includes means for rotating the shaft.

16. The system of claim 15 in which the means for rotating the shaft includes a piston coupled to the shaft and extending from a cylinder connected to the pivotable joint.

17. The system of claim 16 in which the actuator subsystem further includes a coupling member between the piston and the shaft.

18. The system of claim 1 in which the actuator subsystem includes a motor associated with the first frame portion driving a shaft threaded into the second frame portion.

19. The system of claim 1 in which one of the first and second frame portions includes a second joint, a second expandable and contractible portion, and a second actuator subsystem configured to expand and contract the second expandable and contractible portion and angle the first axle relative to the second axle at the second joint.

20. The system of claim 1 in which the joint is located on one side of the frame.

21. They system of claim 1 in which the joint is located interior to the frame defining first and second expandable and contractible portions.

22. The system of claim 21 in which there is an actuator subsystem on each side of the joint configured to expand and contract the first and second expandable and contractible portions.

23. A robot drive system comprising:
   a frame including spaced side walls;
   a first axle rotatably disposed between the spaced side walls;
   a second axle, spaced from the first axle, and rotatably disposed between the spaced side walls;
   an expandable and contractible portion in the frame between the first and second axles; and
   an actuator subsystem configured to expand and contract the expandable and contractible portion to angle the first axle relative to the second axle to steer the robot.

24. The system of claim 23 in which the expandable portion includes a gap in the frame and a joint spanning the gap.

25. The system of claim 24 in which the joint includes a flexible member spanning the gap.

26. The system of claim 24 in which the joint includes a hinge on one side of the gap.

27. The system of claim 23 in which there are two gaps in the frame and a joint between the two gaps.

28. The robot drive system of claim 23 in which the first and second axles each include at least one wheel.

29. The system of claim 28 in which the wheels are magnetic.

30. The system of claim 28 in which the at least one wheel is drum shaped.

31. The system of claim 30 in which the drum shaped wheel is magnetic.

32. The system of claim 31 in which the drum shaped wheel includes alternating magnetic and ferromagnetic material.

33. The system of claim 23 in which the track is magnetic.

34. The system of claim 23 in which the actuator subsystem includes a shaft including threads in one direction on a first end.

35. The system of claim 34 in which the shaft includes threads in an opposite direction on a second end.

36. The system of claim 34 in which the actuator subsystem further includes means for rotating the shaft.

37. The system of claim 36 in which the means for rotating the shaft includes a piston coupled to the shaft and extending from a cylinder.

38. The system of claim 36 in which the means for rotating the shaft includes a motor driving the shaft.

39. The system of claim 23 in which there are two expandable and contractible portions.

40. A robot drive comprising:
   a frame including:
      a first frame portion housing a first magnetic rolling means,
      a second frame portion housing a second magnetic rolling means, and
      at least one expandable and contractable portion defined by a joint between the first and second frame portions;
   an actuator subsystem configured to expand and contract the expandable portion and to flex the joint to angle the first magnetic roller means relative to the second magnetic roller means to steer the robot; and
   a propulsion subsystem for at least one of the first and second magnetic roller means to drive the robot.

41. The robot drive of claim 40 in which the first magnetic rolling means include one or more magnetic wheels, drums, and/or tracks.

42. The robot drive of claim 40 in which the second magnetic rolling means includes one or more magnetic wheels, drums, or tracks.

43. A robot drive system comprising:
   a frame including:
      a first frame portion rotatably supporting a first axle with a first wheel thereon;
      a second frame portion rotatably supporting a second axle with a second wheel thereon, and
      a joint comprising a hinged portion between the first frame portion to the second frame portion and defining an expandable and contractible portion between the first frame portion and second frame portion; and
   an actuator subsystem configured to expand and contract the expandable and contractible portion to move the first frame portion relative to the second frame portion at the joint to angle the first axle relative to the second axle to steer the robot.

* * * * *